(12) United States Patent
Yanagisawa et al.

(10) Patent No.: US 10,883,213 B2
(45) Date of Patent: Jan. 5, 2021

(54) NEEDLE PLATE DETACHABLE MECHANISM AND SEWING MACHINE HAVING NEEDLE PLATE DETACHABLE MECHANISM

(71) Applicant: JANOME SEWING MACHINE CO., LTD., Tokyo (JP)

(72) Inventors: Osamu Yanagisawa, Hachioji (JP); Hideo Suzuki, Hachioji (JP); Shinichi Kato, Hachioji (JP); Jun Mafune, Hachioji (JP)

(73) Assignee: JANOME SEWING MACHINE CO., LTD., Tokyo (JP)

( * ) Notice: Subject to any disclaimer, the term of this patent is extended or adjusted under 35 U.S.C. 154(b) by 68 days.

(21) Appl. No.: 16/296,237

(22) Filed: Mar. 8, 2019

(65) Prior Publication Data
US 2019/0352825 A1    Nov. 21, 2019

(30) Foreign Application Priority Data

May 18, 2018    (JP) .................................. 2018-96049

(51) Int. Cl.
     *D05B 73/12*      (2006.01)
     *D05B 73/00*      (2006.01)
     *F16B 1/00*      (2006.01)

(52) U.S. Cl.
CPC .......... *D05B 73/12* (2013.01); *D05B 73/005* (2013.01); *F16B 1/00* (2013.01); *F16B 2001/0035* (2013.01)

(58) Field of Classification Search
CPC .. D05B 73/12; D05B 73/005; D05B 2203/00; F16B 2001/00035
USPC .................................................. 112/260, 258
See application file for complete search history.

(56) References Cited

U.S. PATENT DOCUMENTS

| | | | | | |
|---|---|---|---|---|---|
| 3,373,709 | A | * | 3/1968 | Gubbay | D05B 73/12 112/260 |
| 4,407,210 | A | * | 10/1983 | Jung | D05B 81/00 112/167 |
| 4,493,280 | A | * | 1/1985 | Bianchi | D05B 73/12 112/260 |
| 4,606,288 | A | * | 8/1986 | Jurgens | D05B 57/02 112/227 |
| 4,646,665 | A | * | 3/1987 | Jimenez | D05B 73/12 112/260 |

(Continued)

FOREIGN PATENT DOCUMENTS

| CN | 1317607 A | 10/2001 |
|---|---|---|
| CN | 203593873 U | 5/2014 |

(Continued)

*Primary Examiner* — Alissa L Hoey
*Assistant Examiner* — Parick J. Lynch
(74) *Attorney, Agent, or Firm* — Yokoi & Co., U.S.A.; Toshiyuki Yokoi

(57) ABSTRACT

In order to prevent a replacement of the needle plate in the situation not suitable for replacing the needle plate, a needle plate detachable mechanism has a needle plate fixing unit for fixing a needle plate on a sewing machine body; a releasing unit for releasing a fixed state of the needle plate; and a fixing-release limiting unit for limiting a release of the fixed state of the needle plate when the needle is positioned below an upper surface of the needle plate or when the sewing machine motor is driven.

7 Claims, 11 Drawing Sheets

(56) References Cited

U.S. PATENT DOCUMENTS

| | | | | |
|---|---|---|---|---|
| 5,775,245 | A * | 7/1998 | Sato | D05B 73/12 112/260 |
| 8,250,999 | B2 * | 8/2012 | Mizuno | D05B 27/02 112/260 |
| 9,828,711 | B2 * | 11/2017 | Maeda | D05B 73/12 |
| 2010/0175601 | A1 * | 7/2010 | Fukao | D05B 73/12 112/260 |
| 2010/0212563 | A1 * | 8/2010 | Mizuno | D05B 27/02 112/260 |
| 2011/0297063 | A1 * | 12/2011 | Fukao | D05B 73/12 112/260 |
| 2016/0040342 | A1 | 2/2016 | Maeda et al. | |
| 2017/0081795 | A1 * | 3/2017 | Hanada | D05B 73/12 |
| 2018/0245256 | A1 * | 8/2018 | Capt | D05B 27/02 |
| 2019/0352826 | A1 * | 11/2019 | Ishikawa | D05B 73/12 |
| 2019/0352827 | A1 * | 11/2019 | Ishikawa | D05B 73/12 |

FOREIGN PATENT DOCUMENTS

| | | | | |
|---|---|---|---|---|
| GB | 882279 A | * | 11/1961 | D05B 73/12 |
| JP | 2013-048846 A | | 3/2013 | |
| JP | 2016-036570 A | | 3/2016 | |
| TW | 201606157 A | | 2/2016 | |

\* cited by examiner

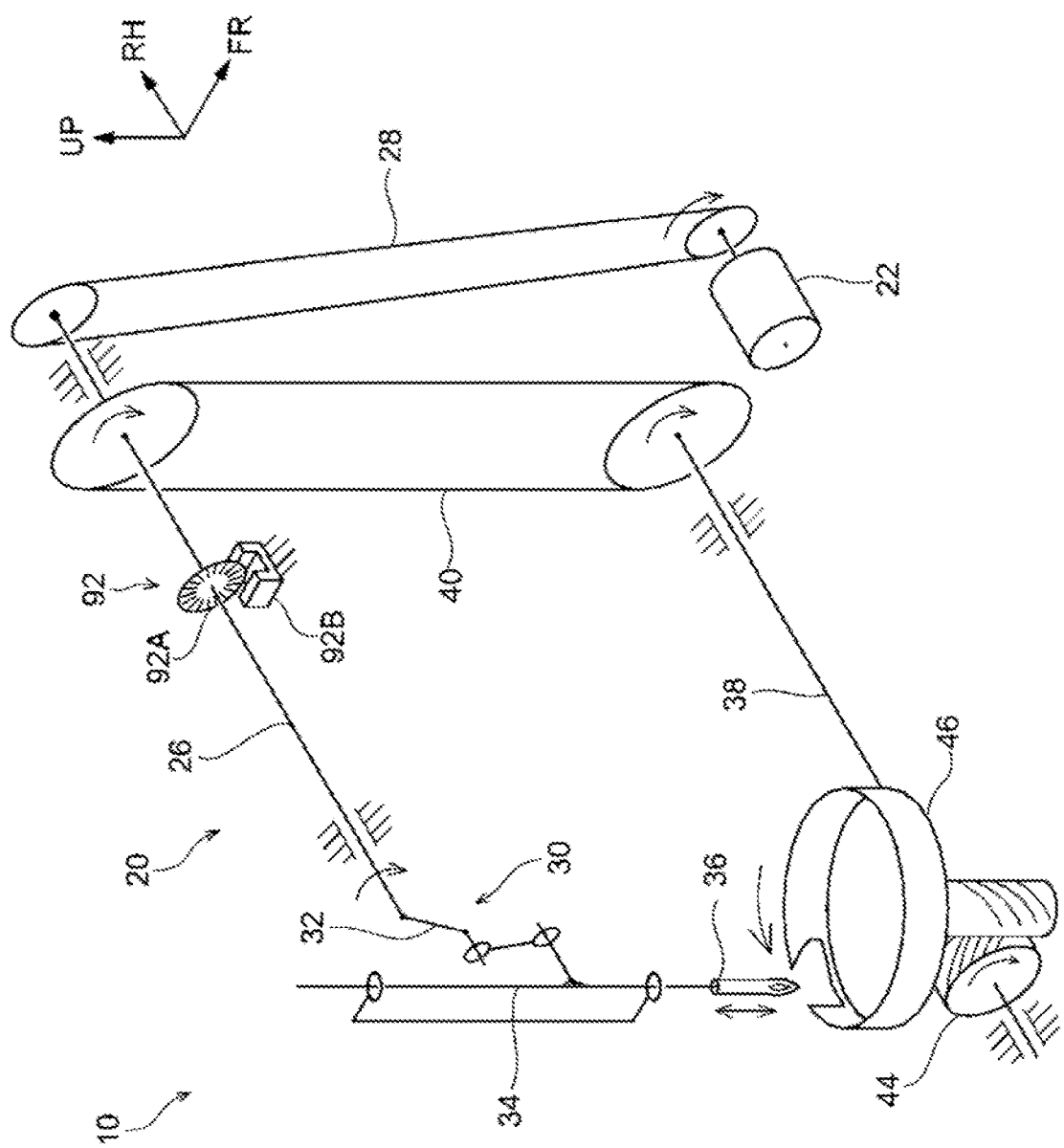

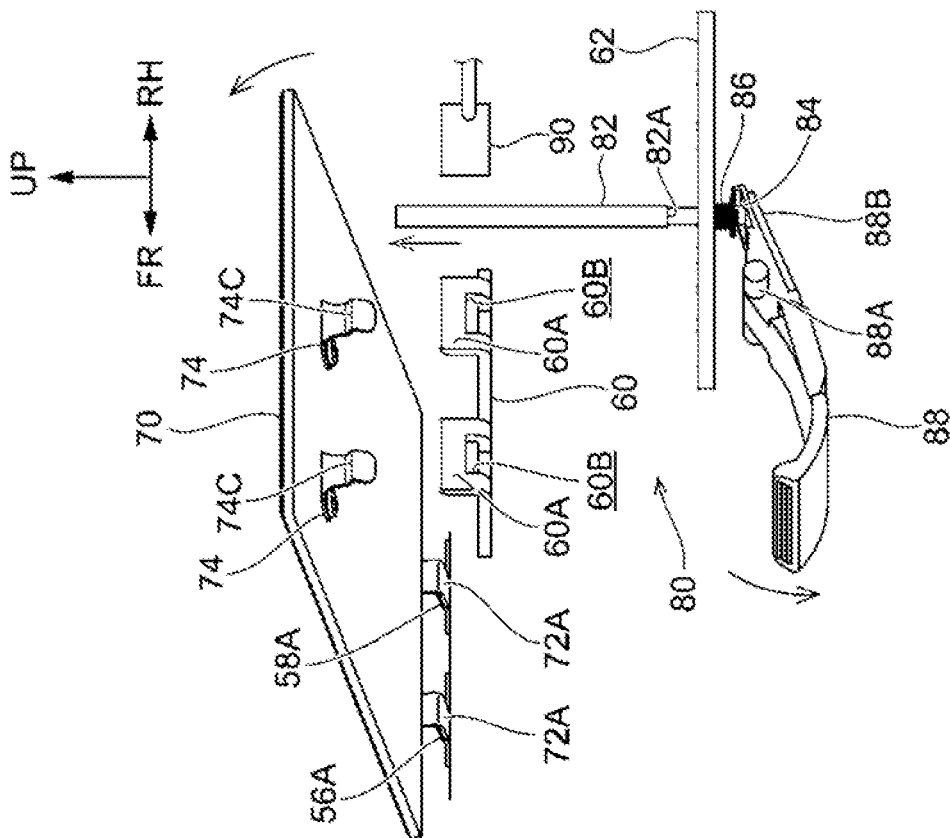
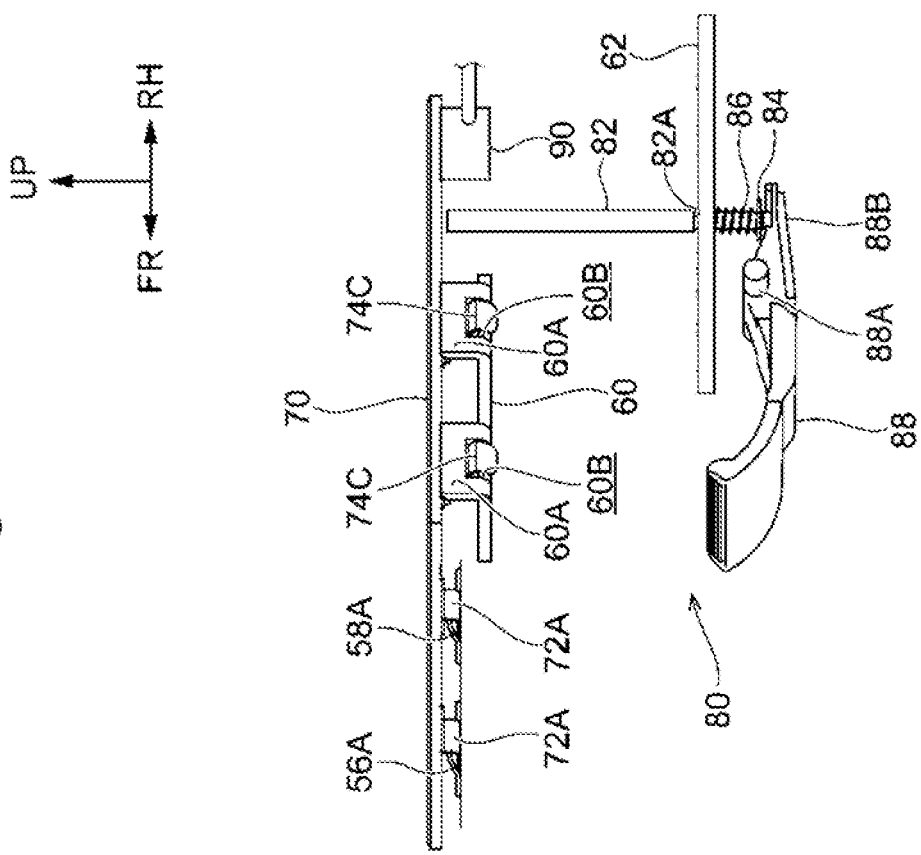

NEEDLE PLATE DETACHABLE MECHANISM AND SEWING MACHINE HAVING NEEDLE PLATE DETACHABLE MECHANISM

CROSS-REFERENCES TO RELATED APPLICATIONS

This patent specification is based on Japanese patent application, No. 2018-96049 filed on May 18, 2018 in the Japan Patent Office, the entire contents of which are incorporated by reference herein.

BACKGROUND OF THE INVENTION

1. Field of the Invention

The present invention relates to a needle plate detachable mechanism and a sewing machine having the needle plate detachable mechanism.

2. Description of the Related Art

Patent documents 1 and 2 below disclose a needle plate detachable mechanism of a sewing machine. In the needle plate detachable mechanism, a needle plate can be detached by operating a release lever or a lock mechanism.

[Patent document 1] Japanese Unexamined Patent Application Publication No. 2013-48846

[Patent document 2] Japanese Unexamined Patent Application Publication No. 2016-36570

BRIEF SUMMARY OF THE INVENTION

In the sewing machine, when a needle descends from a top dead center to a bottom dead center, the needle passes through a needle hole of the needle plate. In Patent documents 1 and 2, the release lever or the lock mechanism can be operated regardless of a vertical position of the needle. Namely, in Patent documents 1 and 2, if the release lever or the lock mechanism is operated when the needle is located at the bottom dead center, for example, a fixed state of the needle plate is released in a state that the needle passes through the needle hole. In this state, the needle plate cannot be detached from the needle since the needle passes through the needle hole although the fixed state of the needle plate is released. The above described situation is not suitable for replacing the needle plate.

In addition, when a sewing machine motor is driven, an operator sews sewing objects. In such situation, the operator has no intention to replace the needle plate. Thus, the above described situation is also not suitable for replacing the needle plate.

As explained above, it is preferable to adapt the structure of preventing the replacement of the needle plate in the situation not suitable for replacing the needle plate.

Considering the above described fact, the present invention provides a needle plate detachable mechanism capable of preventing the replacement of the needle plate in the situation not suitable for replacing the needle plate and a sewing machine having the needle plate detachable mechanism.

One or more embodiments of the present invention relate to a needle plate detachable mechanism of a sewing machine which forms a seam by vertically driving a needle by a driving force of a sewing machine motor, having: a needle plate fixing unit for fixing a needle plate on a sewing machine body; a releasing unit for releasing a fixed state of the needle plate; and a fixing-release limiting unit for limiting a release of the fixed state of the needle plate when the needle is positioned below an upper surface of the needle plate or when the sewing machine motor is driven.

One or more embodiments of the present invention relate to the needle plate detachable mechanism characterized in that the fixing-release limiting unit is configured to increase a fixing force of the needle plate.

One or more embodiments of the present invention relate to the needle plate detachable mechanism characterized in that the fixing-release limiting unit is configured to keep the releasing unit in a non-operation state.

One or more embodiments of the present invention relate to the needle plate detachable mechanism characterized in that the fixing-release limiting unit is provided on the sewing machine body, the fixing-release limiting unit is an electromagnet capable of being magnetically attached to the needle plate or the releasing unit, and the releasing unit is prevented from releasing the fixed state when the needle plate or the releasing unit is magnetically attached to the fixing-release limiting unit.

One or more embodiments of the present invention relate to the needle plate detachable mechanism characterized in that the fixing-release limiting unit has an engaging unit which is engageable with the needle plate or the releasing unit, the fixing-release limiting unit is movable between a release limiting position where the fixing-release limiting unit is engaged with the needle plate or the releasing unit and a release permitting position where the fixing-release limiting unit is disengaged with the needle plate or the releasing unit, the fixing-release limiting unit is prevented from releasing the fixed state in the release limiting position, and the fixing-release limiting unit is permitted to release the fixed state in the release permitting position.

One or more embodiments of the present invention relate to the needle plate detachable mechanism characterized in that the fixing-release limiting unit is a solenoid, and the engaging unit is a plunger of the solenoid.

One or more embodiments of the present invention relate to a sewing machine having the above described needle plate detachable mechanism.

One or more embodiments of the present invention relate to the needle plate detachable mechanism characterized in that the fixing-release limiting unit has a driving unit which is connected with the rotary portion for rotatably driving the rotary portion.

One or more embodiments of the present invention relate to the needle plate detachable mechanism having a detector for detecting a vertical position of the needle, wherein the fixing-release limiting unit is operated interlockingly with the detector to limit the release of the fixed state of the needle plate when the needle is positioned below an upper surface of the needle plate.

One or more embodiments of the present invention relate to the needle plate detachable mechanism, wherein the fixing-release limiting unit is operated interlockingly with the sewing machine motor to lock the needle plate in the fixed state or keep the releasing unit in the non-operation state when the sewing machine motor is driven.

By adopting the needle plate detachable mechanism and the sewing machine having the above described configuration, the replacement of the needle plate can be prevented in the situation not suitable for replacing the needle plate.

BRIEF DESCRIPTION OF THE DRAWINGS

FIG. 3 is a schematic diagram schematically showing a drive mechanism of the sewing machine shown in FIG. 2.

FIG. 7A is a perspective view showing a state where the needle plate is locked by an electromagnet. FIG. 7B is a perspective view showing a state where a fixed state of the needle plate is released and the needle plate is pushed up by a push-up bar.

DETAILED DESCRIPTION OF THE INVENTION

First Embodiment

Figure 1:
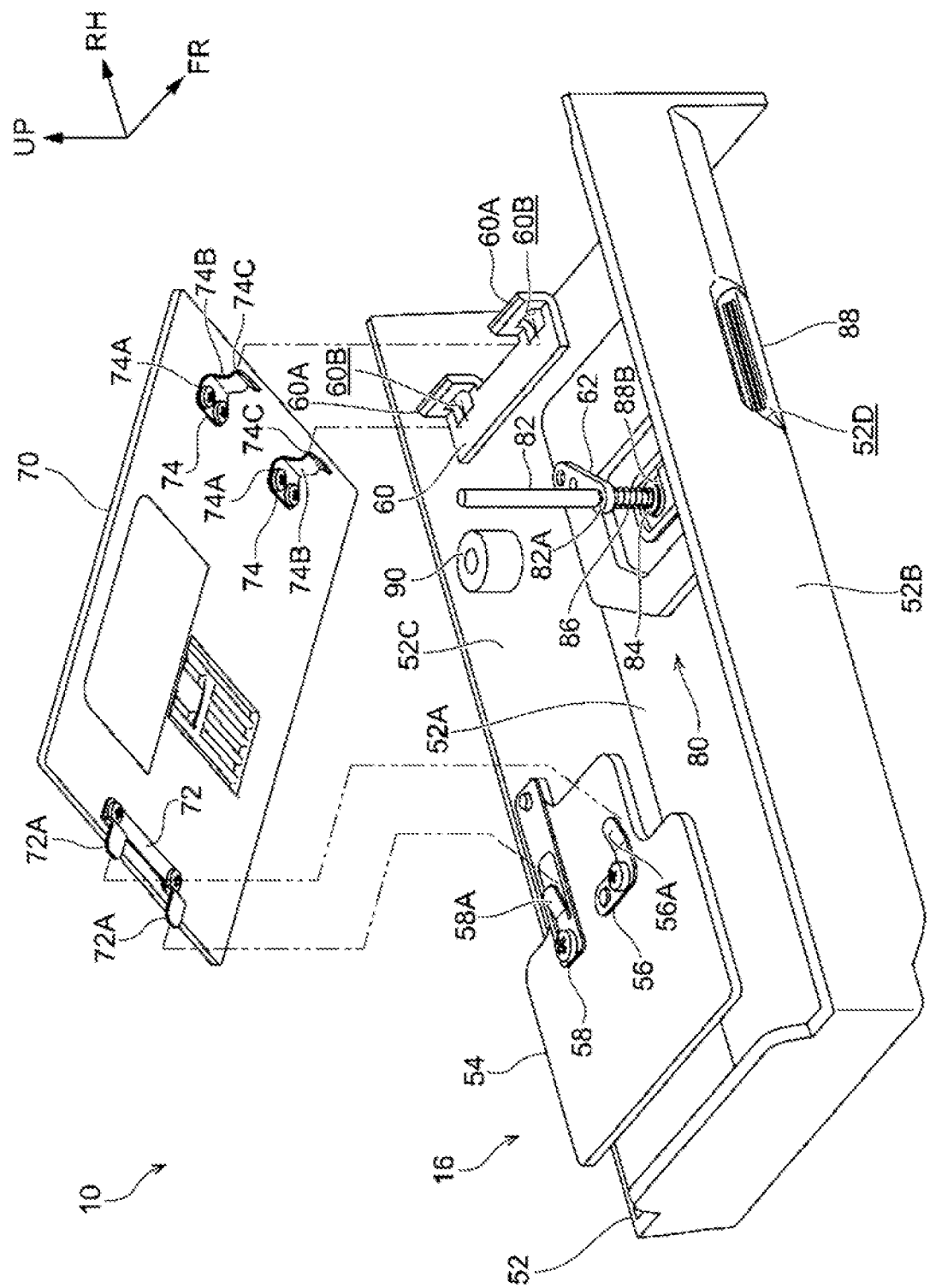
FIG. 1 is a perspective view of a main part of a bed part of a sewing machine to which a needle plate detachable mechanism of the first embodiment is applied, viewed obliquely from the front left.

Hereafter, with reference to the drawings, a sewing machine 10 to which a needle plate detachable mechanism 80 of the first embodiment is applied will be explained. In the arrow marks shown in the drawings, the arrow mark UP indicates upward, the arrow mark FR indicates frontward, and the arrow mark RH indicates rightward (one of the width direction) of the sewing machine 10. Hereafter, when front-rear, up-down and left-right directions are used in the explanation, the directions indicate the front-rear, up-down and left-right directions of the sewing machine 10.

(Entire Constitution of Sewing Machine)

Figure 2:
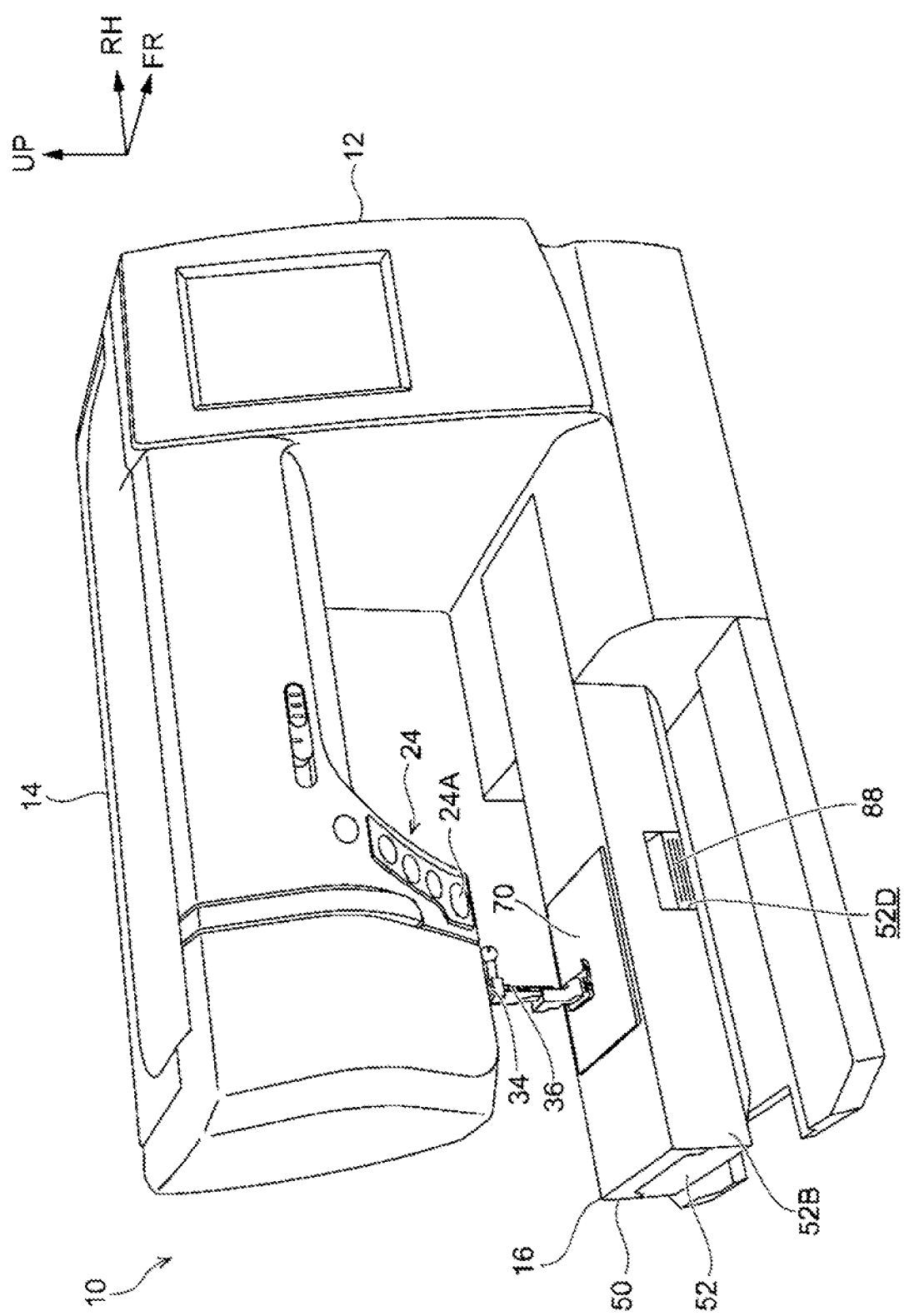
FIG. 2 is a perspective view of an entire sewing machine to which the needle plate detachable mechanism of the first embodiment is applied, viewed obliquely from the front left.

As shown in FIG. 2, the sewing machine 10 as a whole has an approximately U-shape opened to the left side in a front view when viewed from the front. Specifically, the sewing machine 10 includes a post part 12 which is vertically extended to form the right end of the sewing machine 10, an arm part 14 which is extended to the left from the upper end of the post part 12, and a bed part 16 which is extended to the left from the lower end of the post part 12 to serve as "sewing machine body." In addition, a skeleton frame (not shown in the figure) forming a frame of the sewing machine 10 is provided inside the sewing machine 10.

In addition, the sewing machine 10 has a needle plate 70 which is fixed to an upper part of the left side of the bed part 16. Furthermore, the sewing machine 10 has a needle plate detachable mechanism 80 (shown in FIG. 1) for detachably fixing the needle plate 70 and a drive mechanism 20 (shown in FIG. 3) for vertically driving a needle 36. Hereafter, configurations of the sewing machine 10 will be explained.

(About Drive Mechanism)

As shown in FIG. 3, the drive mechanism 20 includes a sewing machine motor 22, an upper shaft 26, a connection mechanism 30, a needle bar 34 and a lower shaft 38.

Figure 4A:
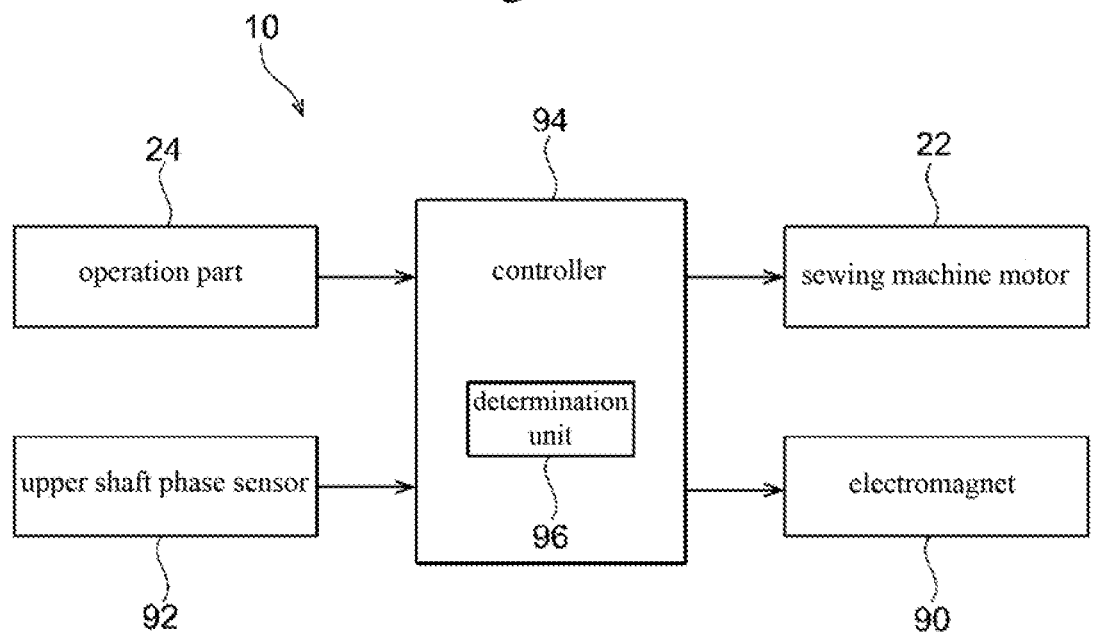
FIG. 4A is a block diagram of the sewing machine shown in FIG. 2.

The sewing machine motor 22 is fixed to the skeleton frame so that the axial direction of the sewing machine motor 22 is aligned with the left-right direction. As shown in FIG. 4A, the sewing machine motor 22 is electrically connected with a controller 94 which will be explained later. An operation part 24 is electrically connected with the controller 94. The operation part 24 has a start/stop button 24A (shown in FIG. 2). When the start/stop button 24A is operated, operation signals are outputted from the operation part 24 to the controller 94. Thus, the sewing machine motor 22 is driven or stopped by the controller 94.

As shown in FIG. 3, the upper shaft 26 is rotatably supported by the skeleton frame in the arm part 14 (not shown in FIG. 3) so that the axial direction of the upper shaft 26 is aligned with the left-right direction. In addition, a belt 28 is laid between the right end of the upper shaft 26 and an output shaft of the sewing machine motor 22. Thus, rotative force of the sewing machine motor 22 is transferred to the upper shaft 26. Consequently, when the sewing machine motor 22 is driven, the upper shaft 26 is rotated around its axis. In addition, a flywheel (not shown in the figure) is connected with the right end of the upper shaft 26. The flywheel is arranged on the right side of the post part 12 of the sewing machine 10 and exposed outside the sewing machine 10. When an operator rotationally operates the flywheel, the sewing machine 10 (upper shaft 26) can be manually driven. In addition, a crank rod 32 which forms the connection mechanism 30 is connected with the left end of the upper shaft 26.

The needle bar 34 is arranged on the left side of the connection mechanism 30 so that the axial direction of the needle bar 34 is aligned with the up-down direction. The crank rod 32 of the connection mechanism 30 is connected with the needle bar 34. When the upper shaft 26 is rotated, the needle bar 34 moves vertically. In addition, the needle 36 for sewing the sewing objects is detachably fixed to the lower end of the needle bar 34. According to the vertical movement of the needle bar 34, the needle 36 is moved vertically. Namely, the vertical position of the needle 36 is determined corresponding to the rotation angle of the upper shaft 26.

Figure 4B:
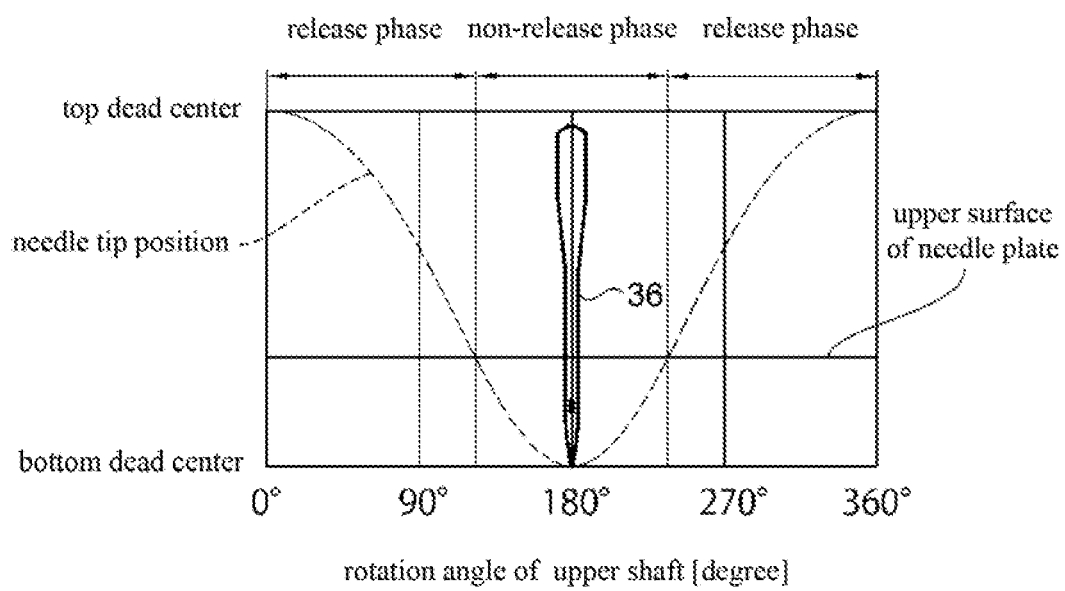
FIG. 4B is a graph showing a vertical position of a needle corresponding to a rotation angle of an upper shaft.

Specifically, as shown in FIG. 4B, the needle 36 moves vertically between the top dead center and the bottom dead center. In addition, the needle plate 70 which will be explained later is arranged between the top dead center and the bottom dead center of the needle 36. Consequently, the sewing objects are sewn by pricking the sewing objects with the needle 36 so that the needle 36 passes through the needle hole formed in the needle plate 70. In the explanation below, during one cycle of the vertical movement of the needle 36, the phase of the upper shaft 26 is referred to as "release phase" when a needle tip (lower end) of the needle 36 is positioned above the upper surface of the needle plate 70, and the phase of the upper shaft 26 is referred to as "non-release phase" when the needle tip (lower end) of the needle 36 is positioned below the upper surface of the needle plate 70.

As shown in FIG. 3, the lower shaft 38 is rotatably supported by the skeleton frame in the bed part 16 (not shown in FIG. 3) so that the axial direction of the lower shaft 38 is aligned with the left-right direction. In addition, a belt 40 is laid between the right end of the lower shaft 38 and the right end of the upper shaft 26. Thus, the lower shaft 38 is rotated interlockingly with the upper shaft 26. In addition, a hook 46 is connected to the left end of the lower shaft 38 via a gear mechanism 44. When the lower shaft 38 is rotated, the hook 46 is rotated so that the axial direction of the hook 46 is aligned with the up-down direction.

(About Bed Part)

As shown in FIG. 2, the bed part 16 includes an upper cover 50 which forms an outer shell of an upper part of the bed part 16, and a lower cover 52 which forms an outer shell of a lower part of the bed part 16. The skeleton frame is covered with the upper cover 50 and the lower cover 52. The lower cover 52 extends in the left-right direction to have an approximately U-shape in cross-section opened to the upper side when viewed from the left-right direction. Specifically, as shown in FIG. 1, the lower cover 52 includes a bottom wall 52A which has a thickness in the up-down direction, a front wall 52B which is bent to the upper side from the front end of the bottom wall 52A, and a rear wall 52C which is bent to the upper side from the rear end of the bottom wall 52A. The bent part between the bottom wall 52A and the front wall 52B and the bent part between the bottom wall 52A and the rear wall 52C are curved in an approximately arc shape.

In addition, a communication hole 52D is formed on a lower part of the right side of the front wall 52B of the lower cover 52 to penetrate in the front-rear direction for placing the front end of a release lever 88 which will be explained later. The communication hole 52D is formed in an approximately rectangular shape when viewed from above. Consequently, the inside and the outside of the lower cover 52 are communicated through the communication hole 52D.

In addition, a fixing plate 54 is provided on the left end of the lower cover 52. The fixing plate 54 is formed in an approximately rectangular plate shape so that the plate thickness direction is aligned with the up-down direction. The fixing plate 54 is connected and fixed to the skeleton frame. A first pressing member 56 having a plate shape and a second pressing member 58 having a plate shape are provided on the upper surface of the fixing plate 54 to fix the needle plate 70 which will be explained later. The first pressing member 56 and the second pressing member 58 are arranged in the front-rear direction so that the plate thickness direction is aligned in the up-down direction. The first pressing member 56 and the second pressing member 58 are fixed to the fixing plate 54 by screws. A pressing piece 56A is integrally formed with the first pressing member 56. The pressing piece 56A is inclined upward (direction separating from the fixing plate 54) toward the right side. In addition, a pressing piece 58A which is configured same as the pressing piece 56A is integrally formed with the second pressing member 58. The pressing piece 58A is inclined upward (direction separating from the fixing plate 54) toward the right side.

In addition, an engaging plate 60 is provided on the right side of the communication hole 52D in the lower cover 52 to function as "needle plate fixing unit" for fixing the needle plate 70. For details, the engaging plate 60 is provided on the lower side of the right end of the needle plate 70 which will be explained later. The engaging plate 60 is formed in an approximately rectangular shape and fixed to the skeleton frame so that the plate thickness direction is aligned with the up-down direction and the longitudinal direction is aligned with the front-rear direction. A pair of front and rear engaging pieces 60A bent to the upper side is formed on the right end of the engaging plate 60. Engaging holes 60B penetrating in the left-right direction are formed on the engaging pieces 60A. Note that the engaging plate 60 forms a part of the needle plate detachable mechanism 80 which will be explained later.

Furthermore, a support member 62 is provided on the lower side of the engaging plate 60. The support member 62 is formed in an approximately long plate shape so that the plate thickness direction is aligned with the up-down direction. A base end of the support member 62 is fixed to the skeleton frame at a position not shown in the figure. In addition, a circular support hole is formed on the tip portion of the support member 62 to penetrate in the up-down direction for supporting a push-up bar 82 which will be explained later.

(About Needle Plate)

The needle plate 70 is formed of a magnetic body. The needle plate 70 is formed in an approximately rectangular shape and fixed to the upper part of the bed part 16 so that the plate thickness direction is aligned with the up-down direction. For convenience of explanation, FIG. 1 shows a state that the front left corner of the needle plate 70 is lifted up. A fixing member 72 having an approximately long plate shape extending in the front-rear direction is formed on the lower surface of the left end of the needle plate 70. The fixing member 72 is fixed to the needle plate 70 by screws. In addition, a pair of front and rear connection pieces 72A is integrally formed with both ends in the longitudinal direction of the fixing member 72. The connection pieces 72A are bent in an approximately crank shape from the left end of the fixing member 72 to the left and below. The tip portions of the connection pieces 72A are inserted into a space between the fixing plate 54 and the pressing piece 56A of the first pressing member 56 and a space between the fixing plate 54 and the pressing piece 58A of the second pressing member 58 from the right side. Thus, the left end of the needle plate 70 is fixed to the fixing plate 54 via the fixing member 72.

In addition, plate springs 74, which function as a pair of front and rear "needle plate fixing units" forming a part of the needle plate detachable mechanism 80 which will be explained later, is provided on the lower surface of the right end of the needle plate 70 at a position corresponding to the above described engaging pieces 60A of the engaging plate 60. The plate springs 74 are bent in an approximately inverse L shape when viewed from the lateral side. Specifically, the plate spring 74 includes a fixing piece 74A which is fixed to the needle plate 70 by screws so that the plate thickness direction is aligned with the up-down direction, and an engaging piece 74B which is bent downward from the right end of the fixing piece 74A and configured to be elastically deformable. In addition, a hook portion 74C projecting rightward is formed on the engaging piece 74B. The engaging pieces 74B of the plate springs 74 are respectively arranged near the left side of the engaging pieces 60A of the engaging plate 60 and the hook portions 74C are engaged with the upper end of the engaging holes 60B. Thus, the plate spring 74 and the engaging plate 60 are engaged with each other to fix the right end of the needle plate 70.

(About Needle Plate Detachable Mechanism)

Next, the needle plate detachable mechanism 80, which is an important part of the present invention, will be explained. As shown in FIG. 1 and FIG. 7, the needle plate detachable mechanism 80 includes the engaging plate 60 and the plate spring 74 which are explained above, the push-up bar 82, the release lever 88 which functions as "releasing unit", an electromagnet 90 which functions as "fixing-release limiting unit", an upper shaft phase sensor 92 (shown in FIG. 3) and the controller 94 (shown in FIG. 4A). The upper shaft phase sensor 92 is an element realized as "detector" in a broad sense. Hereafter, the configuration of the needle plate detachable mechanism 80 will be explained.

<About Push-Up Bar>

The push-up bar 82 is formed in an approximately round rod shape so that the axial direction of the push-up bar 82 is aligned with the up-down direction. The push-up bar 82 is arranged between the needle plate 70 and the bottom wall 52A of the lower cover 52. The lower end of the push-up bar 82 is inserted into the above described support hole of the support member 62 from the above. Thus, the push-up bar 82 is supported by the support member 62 so as to be relatively movable in the up-down direction. In addition, a stepped portion 82A is formed on an outer periphery of the lower end side of the push-up bar 82. With the stepped portion 82A as the boundary, the diameter of the push-up bar 82 is larger at the upper end side compared to the diameter of the lower end side. The stepped portion 82A of the push-up bar 82 is in contact with the upper surface of the support member 62. Consequently, the push-up bar 82 is supported by the support member 62 in a state that the push-up bar 82 is prevented from moving downward. The position of the push-up bar 82 where the stepped portion 82A is in contact with the upper surface of the support member 62 is referred to as "standby position". In the standby position, the upper end of the push-up bar 82 is arranged adjacent to the lower surface of the needle plate 70 (shown in FIG. 7A).

In addition, a retaining ring 84 is locked to the lower end of the push-up bar 82 at the position below the support member 62. Furthermore, a compression coil spring 86 is mounted on the push-up bar 82 at the position between the support member 62 and the retaining ring 84. The upper end of the compression coil spring 86 is locked to the support member 62, and the lower end of the compression coil spring 86 is locked to the retaining ring 84. The compression coil spring 86 is mounted on the push-up bar 82 in a state of being compressed and deformed from its original state. Consequently, the push-up bar 82 is energized downward by the energizing force of the compression coil spring 86 and held at the standby position. When the push-up bar 82 is lifted upward against the energizing force of the compression coil spring 86 to push the needle plate 70 upward, the engaged state between the plate spring 74 of the needle plate 70 and the engaging plate 60 is released and the fixed state of the needle plate 70 is released with respect to the sewing machine 10. Hereafter, the above described position (shown in FIG. 7B) of the push-up bar 82 is referred to as "push-up" position.

<About Release Lever>

The release lever 88 is formed in an approximately rectangular plate shape so that the plate thickness direction is aligned with the up-down direction and the longitudinal direction is aligned with the front-rear direction. A pair of rotary shafts 88A is integrally formed with an intermediate portion of the release lever 88 at both ends in the width direction. The rotary shafts 88A are formed in an approximately cylindrical shape so that the axial direction is aligned with the left-right direction. The rotary shafts 88A are projected outward in the width direction of the release lever 88. The rotary shafts 88A of the release lever 88 are rotatably supported by a bearing portion (not shown in the figure) formed on the above described bottom wall 52A of the lower cover 52.

The dimension in the width direction (left-right direction) of the release lever 88 is specified to be smaller than the dimension in the width direction of the communication hole 52D of the lower cover 52. The front end of the release lever 88 is arranged in the communication hole 52D of the lower cover 52 and exposed outside the lower cover 52 to be operable (shown in FIG. 1 and FIG. 2).

On the other hand, the rear end (for detail, rear side with respect to the rotary shafts 88A) of the release lever 88 is formed as the push-up portion 88B. The push-up portion 88B is arranged immediately below the push-up bar 82. The lower end of the push-up bar 82 is in contact with the push-up portion 88B. Namely, the energizing force of the compression coil spring 86 acts on the rear end of the release lever 88 via the push-up bar 82. In the standby position of the push-up bar 82, the lower surface of the push-up portion 88B is in contact with the upper surface of the bottom wall 52A of the lower cover 52. Thus, the release lever 88 is held in a non-push-up position as shown in FIG. 7A.

As shown in FIG. 7B, when the downward operational force is input to the front end of the release lever 88 to rotate the release lever 88 around the axis of the rotary shafts 88A, the push-up portion 88B of the release lever 88 is displaced upward to push up the push-up bar 82 from the standby position to the push-up position.

<About Electromagnet>

As shown in FIG. 1 and FIG. 7, the electromagnet 90 is formed in an approximately cylindrical shape so that the axial direction of the electromagnet 90 is aligned with the up-down direction. The electromagnet 90 is fixed to the rear wall 52C of the lower cover 52. Specifically, the electromagnet 90 is arranged on the rear side of the push-up bar 82. The upper surface of the electromagnet 90 is adjacent to the lower surface of the needle plate 70. In addition, the electromagnet 90 is electrically connected with the controller 94 which will be explained later. The electromagnet 90 is operated by the controller 94. Specifically, when the electromagnet 90 is electrically energized by the controller 94, a magnetic field is generated in the electromagnet 90 to magnetically attach the needle plate 70. Consequently, the needle plate 70 is held also by the holding force of the electromagnet 90 in addition to the holding force of the plate spring 74. Thus, the fixed state of the needle plate 70 is locked by the electromagnet 90. Namely, a fixing force of the needle plate is increased.

<About Upper Shaft Phase Sensor>

As shown in FIG. 3, the upper shaft phase sensor 92 is provided on an intermediate portion in the longitudinal direction of the upper shaft 26. The upper shaft phase sensor 92 is formed as a sensor for detecting a rotation phase of the upper shaft 26. In the present embodiment, the upper shaft phase sensor 92 is formed as a rotary encoder as an example. Specifically, the upper shaft phase sensor 92 includes a rotary plate 92A having a circular shape and a phase detector 92B. The rotary plate 92A is arranged coaxially with the upper shaft 26 and fixed to the upper shaft 26 so as to be integrally rotated with the upper shaft 26. A plurality of slits extending in the radial direction of the rotary plate 92A is formed on the rotary plate 92A. The slits are arranged at predetermined intervals in the circumferential direction of the rotary plate 92A.

The phase detector 92B has a light emitting element and a light receiving element although they are not illustrated. The light emitting element and the light receiving element are arranged on the rotary plate 92A opposing to each other in the plate thickness direction. The rotary plate 92A is arranged between the light emitting element and the light receiving element. In addition, the phase detector 92B is electrically connected with the controller 94 which will be explained later (shown in FIG. 4A). The light emitting element emits light toward the rotary plate 92A, and the light receiving element receives the light passing through the slits of the rotary plate 92A. Thus, the upper shaft phase sensor 92 detects the rotation angle (phase) of the upper shaft 26 and outputs the detection signals to the controller 94.

<About Controller>

As shown in FIG. 4A, the above described operation part 24, sewing machine motor 22, electromagnet 90 and upper shaft phase sensor 92 are electrically connected with the controller 94. The controller 94 drives and stops the sewing machine motor 22 based on the output signals outputted from the operation part 24.

Furthermore, the controller 94 has a determination unit 96. The determination unit 96 determines whether or not the electromagnet 90 is required to be operated and then the controller 94 controls the operation of the electromagnet 90. Specifically, the determination unit 96 determines whether or not the electromagnet 90 is operated based on the phase state of the upper shaft 26 (i.e., vertical position of the needle 36) and the driving state of the sewing machine 10.

For more detail, when the sewing machine 10 is driven by the sewing machine motor 22 (i.e., in a motor driving state), the determination unit 96 is configured to determine to shift the electromagnet 90 to the operation state. In addition, the determination unit 96 judges whether the rotation phase of the upper shaft 26 is the release phase or the non-release phase based on the detection signals detected by the upper shaft phase sensor 92. In other words, the determination unit 96 judges whether or not the needle tip of the needle 36 is positioned below the upper surface of the needle plate 70. When the sewing machine 10 is not driven by the motor (i.e., in a non-driving state by the sewing machine motor 22) and the phase of the upper shaft 26 is the non-release phase, the determination unit 96 determines to shift the electromagnet 90 to the operation state. When the determination unit 96 determines to shift the electromagnet 90 to the operation state, the controller 94 operates the electromagnet 90 to lock the needle plate 70 in the fixed state by the electromagnet 90. Namely, the electromagnet 90 is operated interlockingly with the upper shaft phase sensor 92. When the phase of the upper shaft 26 is the non-release phase, the needle plate 70 is locked in the fixed state by the electromagnet 90. Thus, the release of the fixed state of the needle plate 70 is limited.

(Operations and Effects)

Figure 5:
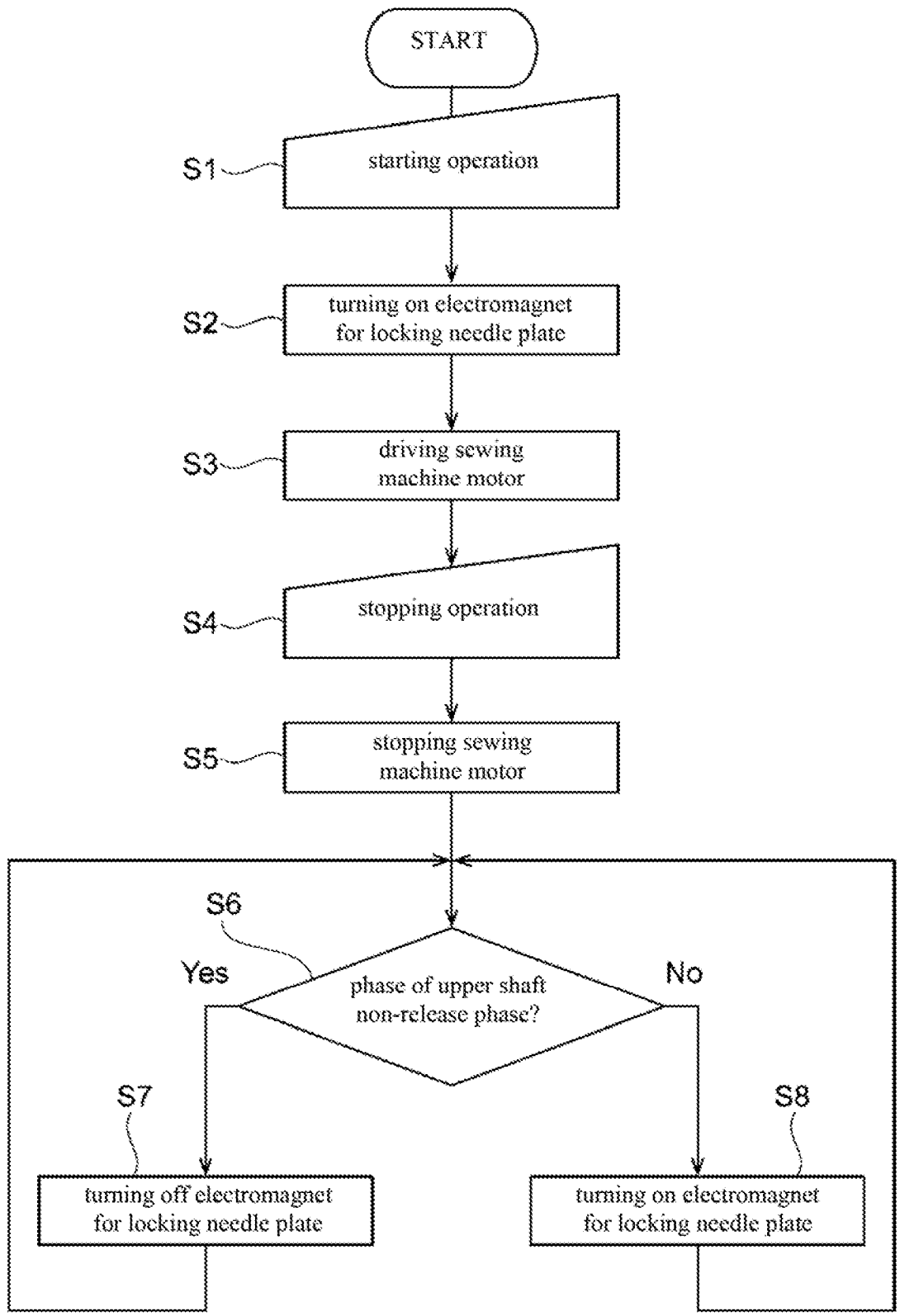
FIG. 5 is an operation flow of the needle plate detachable mechanism.

Next, operations of the needle plate detachable mechanism 80 will be explained with reference to a flowchart shown in FIG. 5.

In order to start driving the sewing machine 10, the operator operates the start/stop button 24A of the operation part 24 (Step S1). Consequently, the operation signals are outputted from the operation part 24 to the controller 94. In the above described state, the driving state of the sewing machine 10 is the motor driving state. Therefore, the determination unit 96 of the controller 94 determines to shift the electromagnet 90 to the operation state and the operation of the electromagnet 90 is started by the controller 94 (Step S2). As a result, the fixed state of the needle plate 70 is locked by the electromagnet 90 (shown in FIG. 7A).

After the process of Step S2, the process shifts to Step S3 and the controller 94 starts driving the sewing machine motor 22. Consequently, the sewing machine 10 is shifted from the stop state to the driving state to start sewing the sewing objects.

After the process of Step S3, in order to stop driving the sewing machine 10, the operator operates the start/stop button 24A of the operation part 24 (Step S4). As a result, the operation signals are outputted from the operation part 24 to the controller 94. The controller 94, which receives the signals from the operation part 24, stops driving the sewing machine motor 22, and the sewing machine 10 is shifted from the motor driving state to the stop state (Step S5).

After the process of Step S5, the process shifts to Step S6 and the determination unit 96 judges the phase state of the upper shaft 26 based on the detection signals of the upper shaft phase sensor 92. Specifically, the determination unit 96 judges whether or not the phase of the upper shaft 26 is the release phase. When the phase of the upper shaft 26 is the release phase (Yes in Step S6), the process shifts to Step S7.

In Step S7, the determination unit 96 determines to shift the electromagnet 90 to the non-operation state and the operation of the electromagnet 90 is stopped by the controller 94. Consequently, the fixed state of the needle plate 70 locked by the electromagnet 90 is unlocked. Therefore, the detachment (removal) of the needle plate 70 is allowed in the above described state. In the above described state, when the operator applies the operational force downwardly on the front end of the release lever 88, the release lever 88 is rotated from the non-push-up position. Consequently, the push-up portion 88B of the release lever 88 is displaced upward to push up the push-up bar 82. Therefore, the push-up bar 82 is displaced from the standby position to the push-up position and the push-up bar 82 pushes up the needle plate 70. Thus, the plate spring 74 of the needle plate 70 is disengaged from the engaging plate 60. As a result, the fixed state of the needle plate 70 is released (shown in FIG. 7B).

After the sewing machine motor 22 is stopped, the operator may sew the sewing objects with manual operation without detaching the needle plate 70. Therefore, after the process of Step S7, the process returns to Step S6 and the determination unit 96 repeats the judgement based on the rotation phase of the upper shaft 26.

On the other hand, when the phase of the upper shaft 26 is the non-release phase (No in Step S6), the process shifts to Step S8. In Step S8, the determination unit 96 determines to shift the electromagnet 90 to the operation state and the operation of the electromagnet 90 is kept by the controller 94. Consequently, the fixed state of the needle plate 70 locked by the electromagnet 90 is kept. After the process of Step S8, the process returns to Step S6 and the determination unit 96 repeats the judgement based on the rotation phase of the upper shaft 26.

Hereafter, the operation of the needle plate detachable mechanism 80 explained with reference to the above described flowchart will be further explained with reference to the timing chart shown in FIG. 6. In the timing chart of FIG. 6, (A) indicates the driving state of the sewing machine 10, (B) indicates the driving state of the sewing machine motor 22, and (C) indicates the phase of the upper shaft 26. In addition, in the timing chart of FIG. 6, (D) indicates the operation state of the electromagnet 90, and (E) indicates the holding force to hold the needle plate 70.

In the stop state (shown as stage "a" in FIG. 6) of the sewing machine 10, the sewing machine motor 22 is in the non-driving state (OFF state), and the electromagnet 90 is in the non-operation state (OFF state). At that time, the phase of the upper shaft 26 is the release phase, and the needle 36 is positioned above the needle plate 70 (i.e., sewing objects). Furthermore, at that time, the holding force for holding the needle plate 70 is the holding force F1 applied by the plate spring 74.

Figure 6:
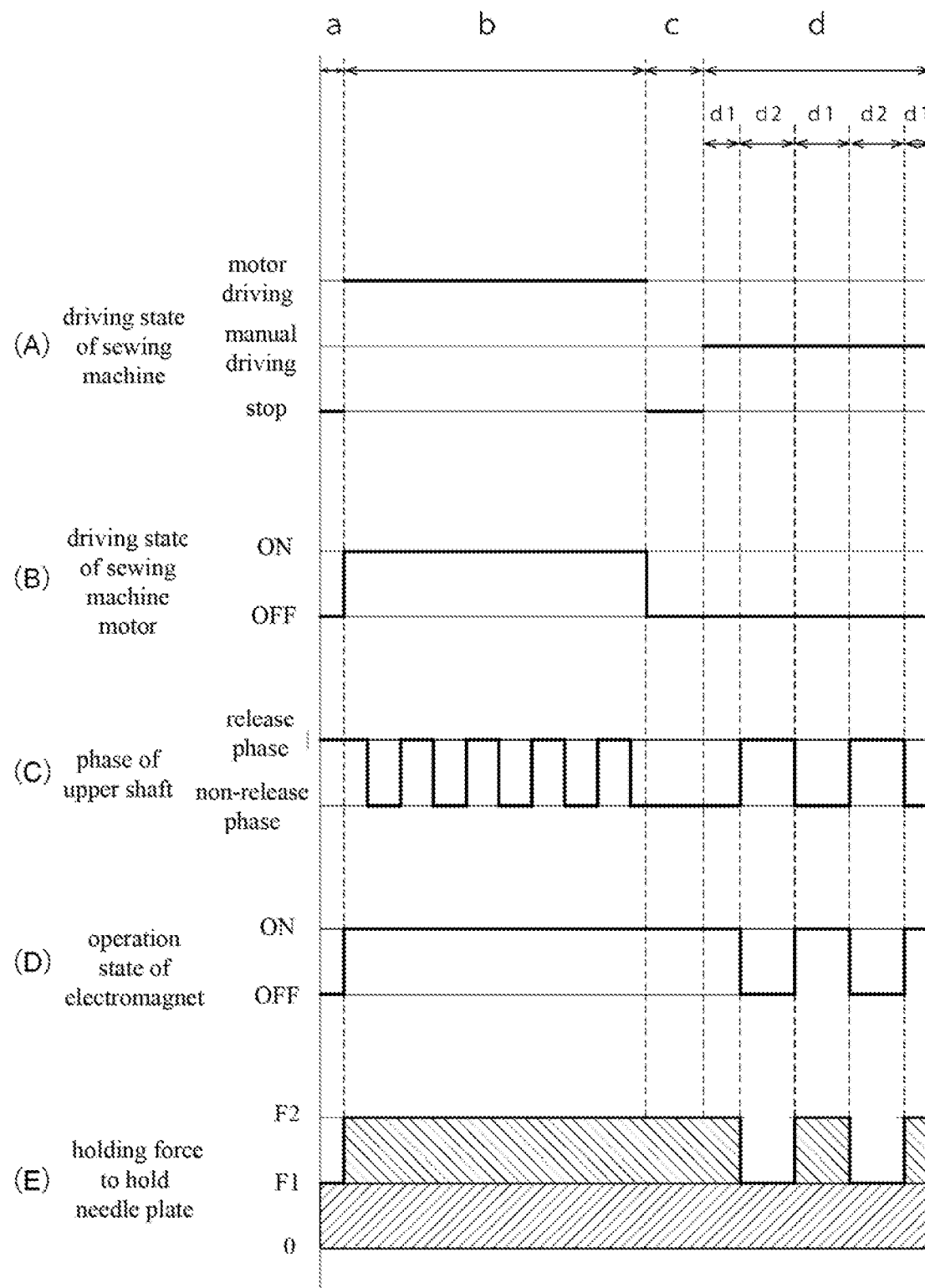
FIG. 6 is a timing chart of the needle plate detachable mechanism.

In the stop state of the sewing machine 10, when the operator operates the start/stop button 24A of the operation part 24 to start driving the sewing machine 10, the sewing machine 10 is shifted from the stop state to the motor driving state (shown as stage "b" in FIG. 6). Specifically, the determination unit 96 determines to operate the electromagnet 90, and the electromagnet 90 is operated by the controller 94 (ON state). In addition, at that time, the sewing machine motor 22 is driven by the controller 94 and shifted to the driving state (ON state). Consequently, the upper shaft 26 is rotated and the needle 36 is vertically moved. Therefore, the phase of the upper shaft 26 is changed between the release phase and the non-release phase alternately and repeatedly. In addition, since the electromagnet 90 is operated in the above described state, the holding force holding the needle plate 70 is the holding force F2 which is calculated by adding the holding force applied by the electromagnet 90 to the holding force F1 applied by the plate spring 74.

From the above described state, when the operator operates the start/stop button 24A of the operation part 24, the sewing machine 10 is shifted from the motor driving state to the stop state (shown as stage "c" in FIG. 6). Specifically, the sewing machine motor 22 is shifted from the driving state (ON state) to the non-driving state (OFF state) by the controller 94. In the example shown in FIG. 6, when the driving of the sewing machine 10 is stopped, the phase of the upper shaft 26 is the non-release phase. Therefore, the determination unit 96 determines to shift the electromagnet 90 to the operation state and the operation of the electromagnet 90 operated by the controller 94 is kept. Accordingly, the holding force holding the needle plate 70 is kept to be the holding force F2.

From the above described state, when the operator manually operates the sewing machine 10 by using the flywheel of the sewing machine 10, the sewing machine 10 is shifted from the stop state to the manual driving state (shown as stage "d" in FIG. 6). In the above described state, the non-driving state of the sewing machine motor 22 is kept. In addition, since the upper shaft 26 is rotated in the manual operation, the phase of the upper shaft 26 is changed between the non-release phase (shown as stage "d1" in FIG. 6) and the release phase (shown as stage "d2" in FIG. 6) alternately and repeatedly. Consequently, when the phase of the upper shaft 26 is the release phase, the determination unit 96 determines to shift the electromagnet 90 to the non-operation state and the driving of the electromagnet 90 is stopped by the controller 94. On the other hand, when the phase of the upper shaft 26 is the non-release phase, the determination unit 96 determines to shift the electromagnet 90 to the driving state and the electromagnet 90 is operated by the controller 94.

In the stages where the operation of the electromagnet 90 is stopped, the holding force of the needle plate 70 is F1. Thus, the detachment of the needle plate 70 is allowed in the above described state. On the other hand, in the stages where the electromagnet 90 is operated, the holding force of the needle plate 70 is F2. Thus, the fixed state of the needle plate 70 is locked.

As explained above, in the needle plate detachable mechanism 80 of the present embodiment, when the sewing machine motor 22 is driven, the electromagnet 90 is operated to lock the fixed state of the needle plate 70 by the electromagnet 90. Thus, the release lever 88 is prevented from releasing the fixed state of the needle plate 70. When the sewing machine motor 22 is driven, the operator is sewing the sewing objects. Thus, the operator has no intention to replace the needle plate 70 in the above described situation. Namely, the above described situation is not suitable for replacing the needle plate 70. In such a situation, the replacement of the needle plate 70 can be prevented (prohibited).

In addition, when the sewing machine motor 22 is not driven and the phase of the upper shaft 26 is the non-release phase, the electromagnet 90 is operated and the fixed state of the needle plate 70 is locked by the electromagnet 90. Thus, the release lever 88 is prevented from releasing the fixed state of the needle plate 70. Namely, even when the sewing machine motor 22 is not driven, when the needle 36 is positioned below the upper surface of the needle plate 70, the release of the fixed state of the needle plate 70 is limited by the electromagnet 90. When the needle 36 is positioned below the upper surface of the needle plate 70, the needle 36 passes through the needle hole of the needle plate 70. Therefore, the above described situation is not suitable for replacing the needle plate 70. Also in such a situation, the replacement of the needle plate 70 can be prevented.

As explained above, by using the needle plate detachable mechanism 80 of the present embodiment, the replacement of the needle plate 70 can be prevented in the situation not suitable for replacing the needle plate 70.

In the present embodiment, as explained above, the electromagnet 90 is operated to lock the fixed state of the needle plate 70. Thus, the release lever 88 is prevented from releasing the fixed state of the needle plate 70. Therefore, the needle plate 70 is locked by efficiently using the magnetic force of the electromagnet 90. Thus, the release lever 88 can be prevented from releasing the fixed state of the needle plate 70. Consequently, the replacement of the needle plate 70 can be prevented by a simple configuration in the situation not suitable for replacing the needle plate 70.

In addition, the needle plate detachable mechanism 80 has the upper shaft phase sensor 92 for detecting the rotation phase of the upper shaft 26. Therefore, the vertical position of the needle 36 can be easily detected by detecting the rotation phase (angle) of the upper shaft 26 by the upper shaft phase sensor 92. Thus, the vertical position of the needle 36 can be detected by a simple configuration in the needle plate detachable mechanism 80.

Variation Example 1 of Needle Plate Detachable Mechanism in First Embodiment

Hereafter, a needle plate detachable mechanism 100 of the variation example 1 of the first embodiment will be explained with reference to FIG. 8. The needle plate detachable mechanism 100 of the variation example 1 is configured in the same way as the needle plate detachable mechanism 80 of the first embodiment except for the below explained points. Note that the same reference numerals as the needle plate detachable mechanism 80 of the first embodiment are used in FIG. 8 for the members configured in the same way.

Figure 8A:
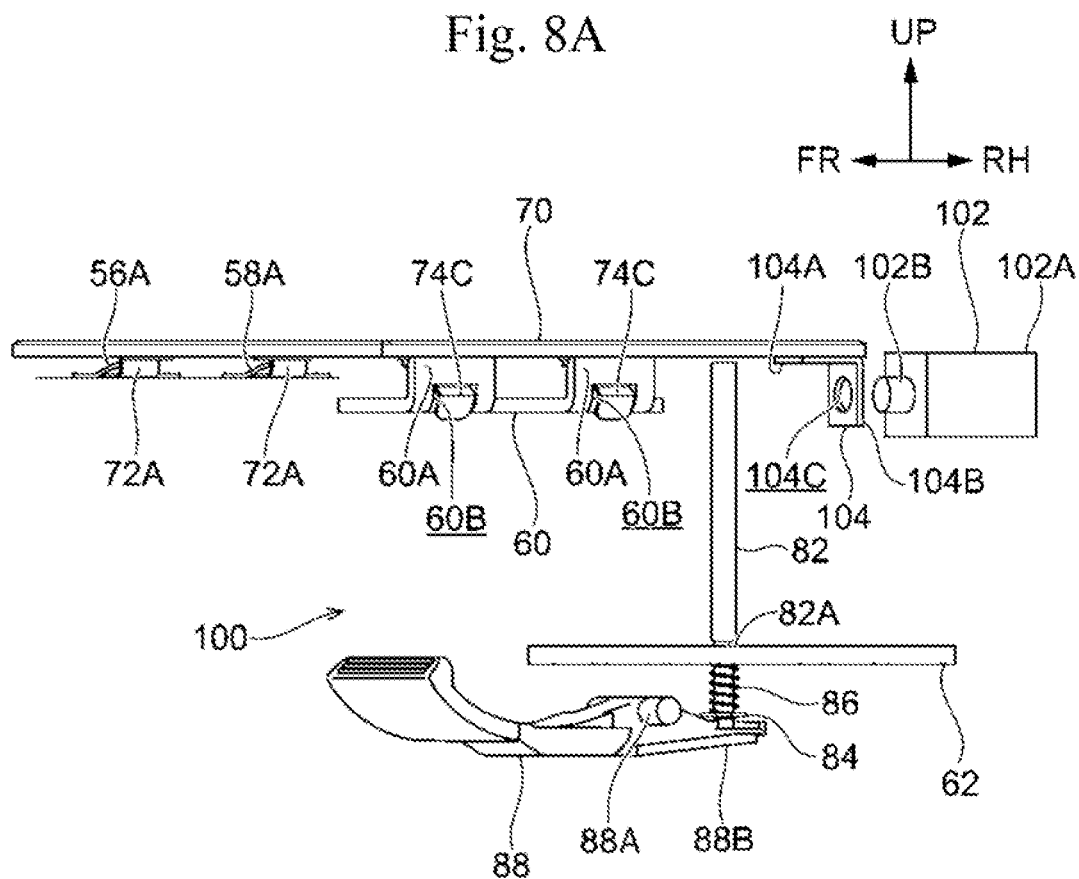
FIG. 8A is a perspective view showing a state where the solenoid is before operated in the needle plate detachable mechanism of variation example 1 of the first embodiment.
Figure 8B:
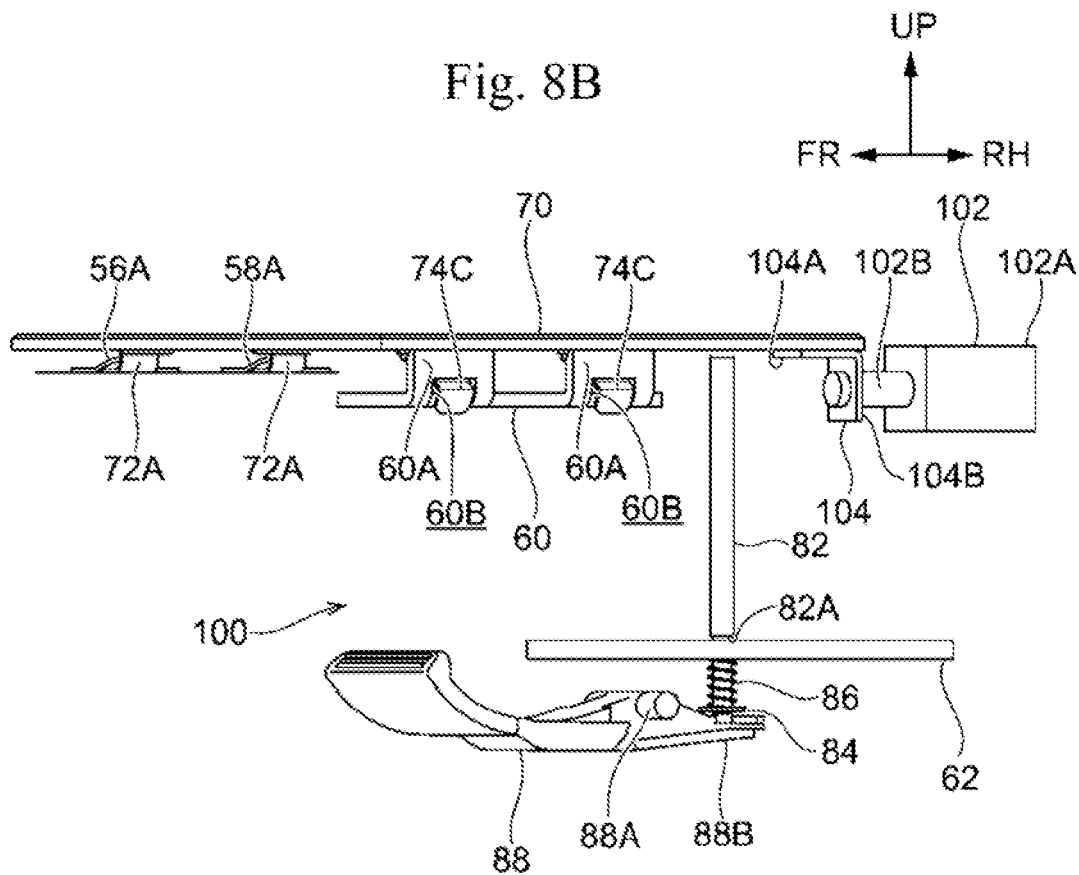
FIG. 8B is a perspective view showing a state where the solenoid is operated from the state of FIG. 8A and the needle plate is locked by the solenoid.

Namely, the needle plate detachable mechanism 100 has a solenoid 102 to function as "fixing-release limiting unit" instead of the electromagnet 90. The solenoid 102 is arranged on the lower and lateral sides of the needle plate 70 and fixed to the lower cover 52 (not shown in FIG. 8) or the skeleton frame of the sewing machine 10, for example. The solenoid 102 includes a solenoid body 102A having an approximately rectangular parallelepiped shape and a plunger 102B having an approximately cylindrical shape to function as "engaging unit." The plunger 102B is projected from one end of the solenoid body 102A. The plunger 102B is configured to be rotatable around its axis relatively to the solenoid body 102A. In addition, the solenoid 102 is electrically connected with the controller 94 and operated by the controller 94. Specifically, as shown in FIG. 8A, when the solenoid 102 is not electrically energized, most of a base end of the plunger 102B is arranged inside the solenoid body 102A and only a tip portion of the plunger 102B is projected from the solenoid body 102A. Hereafter, the above described position is referred to as "release permitting position." On the other hand, as shown in FIG. 8B, when the solenoid 102 is electrically energized by the controller 94, the plunger 102B is moved from the release permitting position to the tip end side and most of the plunger 102B is projected from the solenoid body 102A. Hereafter, the above described position is referred to as "release limiting position." Namely, the solenoid 102 is configured as a so-called push-type solenoid.

In addition, an engaging plate 104 is provided on the lower surface of the needle plate 70. The engaging plate 104 is an element realized as "engaging unit" in a broad sense. The engaging plate 104 is formed in an approximately inverse L shape. Specifically, the engaging plate 104 includes a fixing piece 104A which is formed so that the plate thickness direction is aligned with the up-down direction and an engaging piece 104B which is bent downward at an approximately right angle on one end of the fixing piece 104A. The fixing piece 104A is fixed to the lower surface of the needle plate 70 by, for example, fastening members such as screws so that the engaging piece 104B faces the plunger 102B in the axial direction of the plunger 102B.

In addition, an engaging hole 104C having an approximately circular shape is penetratingly formed on the engaging piece 104B. The diameter dimension of the engaging hole 104C is specified to be larger than the diameter dimension of the plunger 102B. The engaging hole 104C is arranged coaxially with the plunger 102B. In the state that the solenoid 102 is electrically energized, when the plunger 102B is moved to the release limiting position, the tip portion of the plunger 102B is inserted into the engaging hole 104C and engaged with the engaging piece 104B in the up-down direction (shown in FIG. 8B). Consequently, the engaging plate 104 (i.e., needle plate 70) is prevented from moving upward by the solenoid 102. Thus, the release of the fixed state of the needle plate 70 is limited by the solenoid 102.

When the sewing machine motor 22 is driven, the solenoid 102 is operated by the controller 94 and the fixed state of the needle plate 70 is locked by the solenoid 102. Thus, the release lever 88 is prevented from releasing the fixed state of the needle plate 70.

In addition, when the sewing machine motor 22 is not driven and the phase of the upper shaft 26 is the non-release phase, the solenoid 102 is operated by the controller 94 and the fixed state of the needle plate 70 is locked by the solenoid 102. Thus, the release lever 88 is prevented from releasing the fixed state of the needle plate 70. Namely, when the sewing machine motor 22 is not driven and the needle 36 is positioned below the upper surface of the needle plate 70, the needle plate 70 is locked to the fixed state by the solenoid 102. Therefore, also in the needle plate detachable mechanism 100 of the variation example 1, the replacement of the needle plate 70 can be prevented in the situation not suitable for replacing the needle plate 70.

In the needle plate detachable mechanism 100 of the variation example 1, the fixed state of the needle plate 70 is locked by the solenoid 102. Thus, the release lever 88 is prevented from releasing the fixed state of the needle plate 70. Therefore, same as the needle plate detachable mechanism 80, the replacement of the needle plate 70 can be prevented by a simple configuration in the situation not suitable for replacing the needle plate 70.

Variation Example 2 of Needle Plate Detachable Mechanism in First Embodiment

Figure 9A:
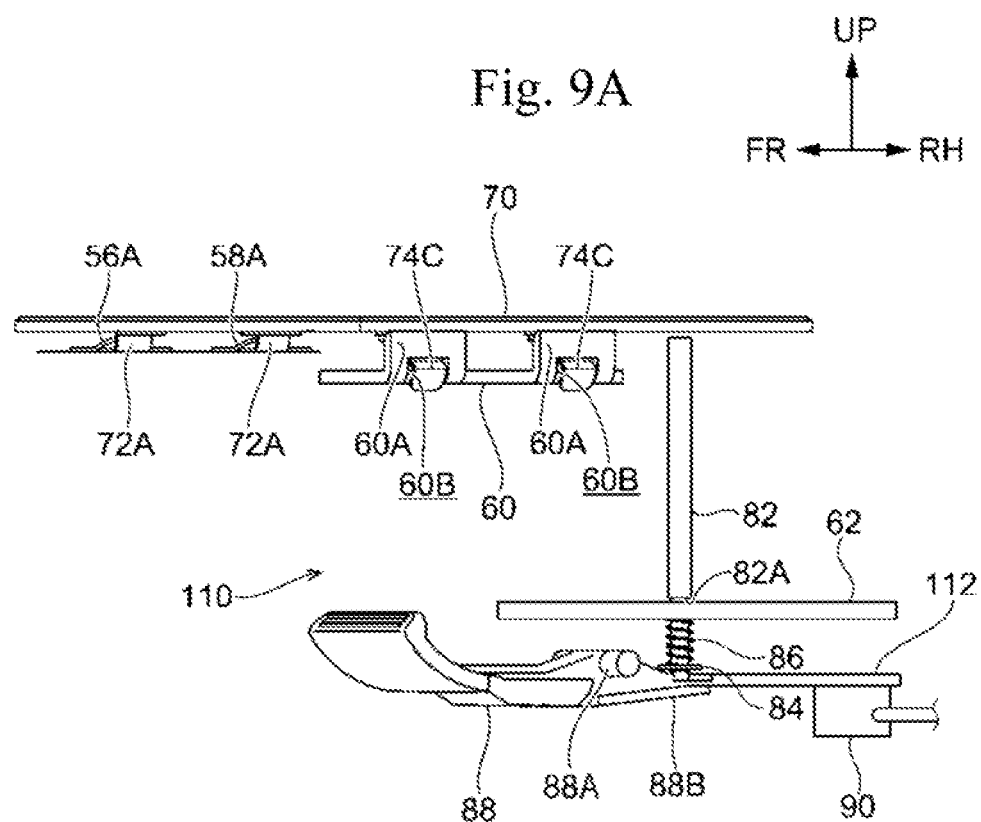
FIG. 9A is a perspective view showing the needle plate detachable mechanism of the variation example 2 of the first embodiment.

Hereafter, a needle plate detachable mechanism 110 of the variation example 2 of the first embodiment will be explained with reference to FIG. 9A. The needle plate detachable mechanism 110 of the variation example 2 is configured in the same way as the needle plate detachable mechanism 80 of the first embodiment except for the below explained points. Note that the same reference numerals as the needle plate detachable mechanism 80 of the first embodiment are used in FIG. 9A for the members configured in the same way.

Namely, in the needle plate detachable mechanism 110, a lock plate 112 formed of a magnetic body is integrally provided with the push-up portion 88B of the release lever 88. The lock plate 112 is an element realized as "lock member" in a broad sense. The lock plate 112 is formed in an approximately long plate shape so that the plate thickness direction is aligned with the up-down direction. One end in the longitudinal direction of the lock plate 112 is fixed to the push-up portion 88B of the release lever 88.

In the needle plate detachable mechanism 110, the electromagnet 90 is fixed to the bottom wall 52A of the lower cover 52 (not shown in FIG. 9A) and arranged adjacent to the lower side of the other end in the longitudinal direction of the lock plate 112. Consequently, when the electromagnet 90 is operated by the controller 94, the lock plate 112 is magnetically attached to the electromagnet 90 by the magnetic force of the electromagnet 90. Therefore, the release lever 88 is prevented from moving upward at the push-up portion 88B. As a result, the release lever 88 is locked to the non-operation state and kept in the non-push-up position.

When the sewing machine motor 22 is driven, the electromagnet 90 is operated by the controller 94 and the release lever 88 is locked in the non-operation state by the electromagnet 90. Namely, the rotating operation of the release lever 88 is disabled and the release lever 88 is kept in the non-push-up position. Consequently, the release lever 88 is prevented from releasing the fixed state of the needle plate 70. Thus, the replacement of the needle plate 70 is prevented.

In addition, when the sewing machine motor 22 is not driven and the phase of the upper shaft 26 is the non-release phase, the electromagnet 90 is operated by the controller 94 and the release lever 88 is locked in the non-operation state by the electromagnet 90. Accordingly, also in the above described case, the rotating operation of the release lever 88 is disabled and the release lever 88 is kept in the non-push-up position. Consequently, the release lever 88 is prevented from releasing the fixed state of the needle plate 70. Thus, the replacement of the needle plate 70 is prevented.

As explained above, also in the needle plate detachable mechanism 110 of the variation example 2, the replacement of the needle plate 70 can be prevented in the situation not suitable for replacing the needle plate 70.

Variation Example 3 of Needle Plate Detachable Mechanism in First Embodiment

Figure 9B:
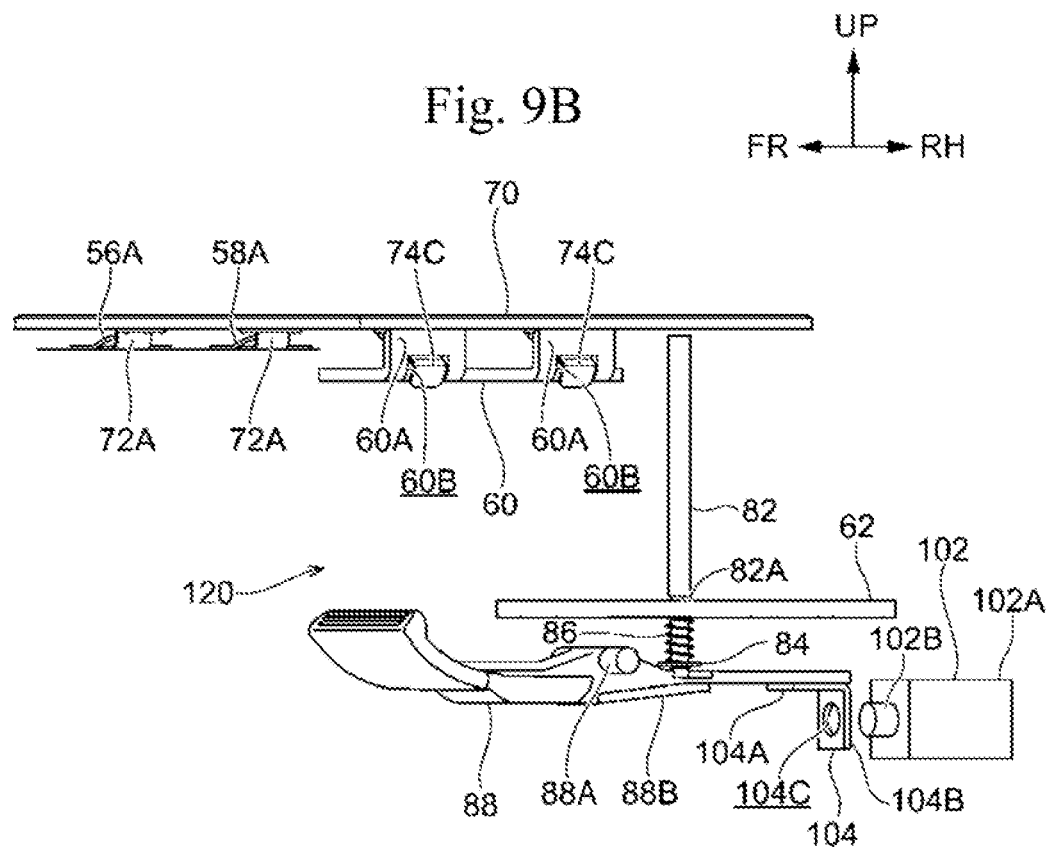
FIG. 9B is a perspective view showing the needle plate detachable mechanism of the variation 3 of the first embodiment.

Hereafter, a needle plate detachable mechanism 120 of the variation example 3 of the first embodiment will be explained with reference to FIG. 9B. The needle plate detachable mechanism 120 of the variation example 3 is configured in the same way as the needle plate detachable mechanism 110 of the variation example 2 except for the below explained points. Note that the same reference numerals as the needle plate detachable mechanism 110 of the variation example 2 are used in FIG. 9B for the members configured in the same way.

Namely, the needle plate detachable mechanism 120 has the solenoid 102 of the needle plate detachable mechanism 100 of the variation example 1 instead of the electromagnet 90. The solenoid 102 is fixed to the bottom wall 52A of the lower cover 52 (not shown in FIG. 9B). In addition, the engaging plate 104 of the needle plate detachable mechanism 100 of the variation example 1 is integrally formed with the other end of the lock plate 112. The engaging piece 104B of the engaging plate 104 is arranged to face the plunger 102B in the axial direction of the plunger 102B of the solenoid 102.

In the state that the solenoid 102 is electrically energized, when the plunger 102B is moved to the release limiting position, the tip portion of the plunger 102B is inserted into the engaging hole 104C of the engaging plate 104 and engaged with the engaging piece 104B in the up-down direction. Consequently, same as the variation example 2, the rotating operation of the release lever 88 is disabled and the replacement of the needle plate 70 is prevented.

When the sewing machine motor 22 is driven, the solenoid 102 is operated by the controller 94 and the release lever 88 is locked in the non-operation state by the solenoid 102. Namely, the rotating operation of the release lever 88 is disabled. Consequently, the replacement of the needle plate 70 is prevented.

In addition, when the sewing machine motor 22 is not driven and the phase of the upper shaft 26 is the non-release phase, the solenoid 102 is operated by the control of the controller 94 and the release lever 88 is locked in the non-operation state by the solenoid 102. Also in the above described case, the rotating operation of the release lever 88 is disabled and the replacement of the needle plate 70 is prevented.

As explained above, also in the needle plate detachable mechanism 120 of the variation example 3, the replacement of the needle plate 70 can be prevented in the situation not suitable for replacing the needle plate 70.

Second Embodiment

Figure 10:
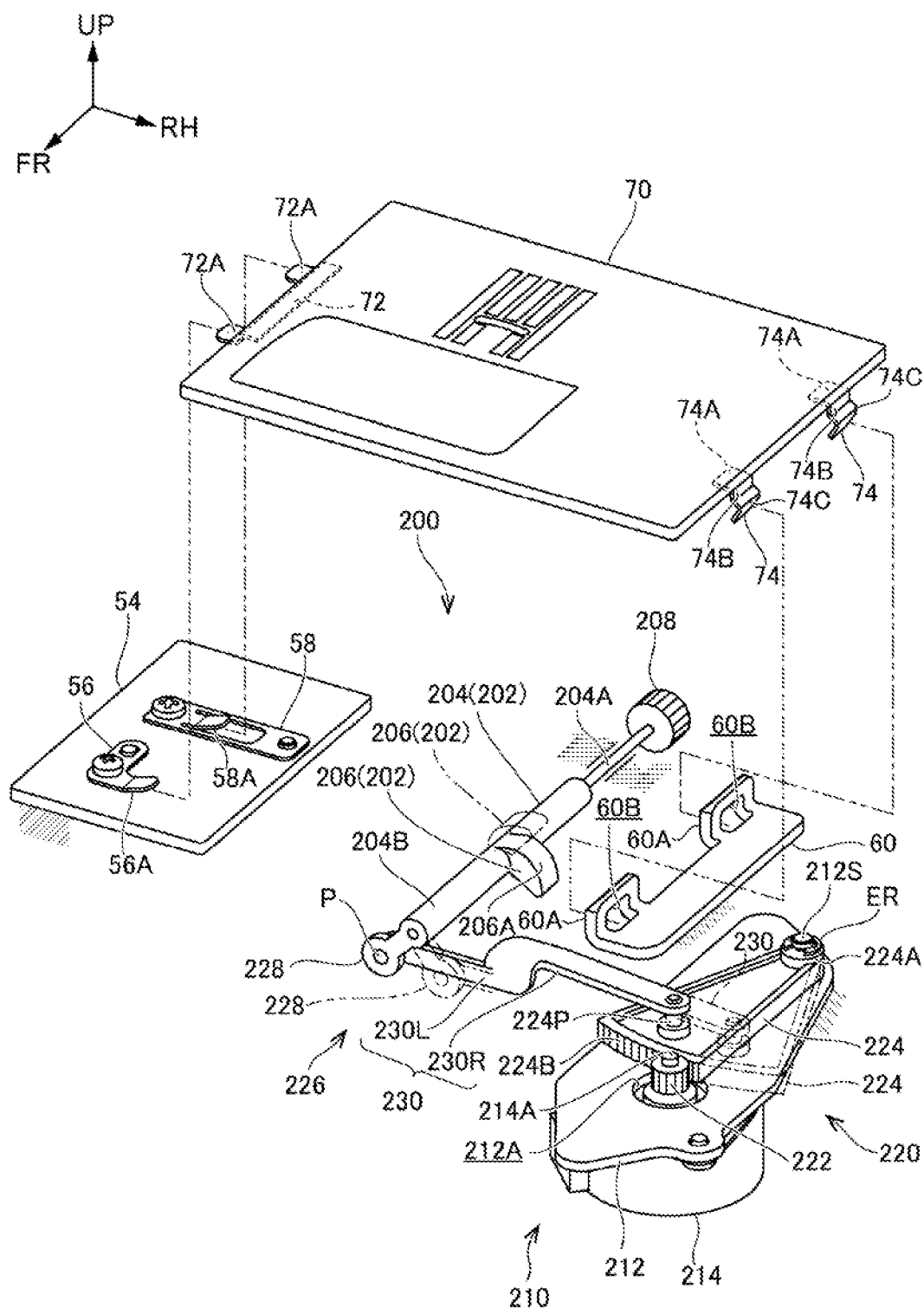
FIG. 10 is an exploded perspective view of the needle plate detachable mechanism of the second embodiment.
Figure 11A:
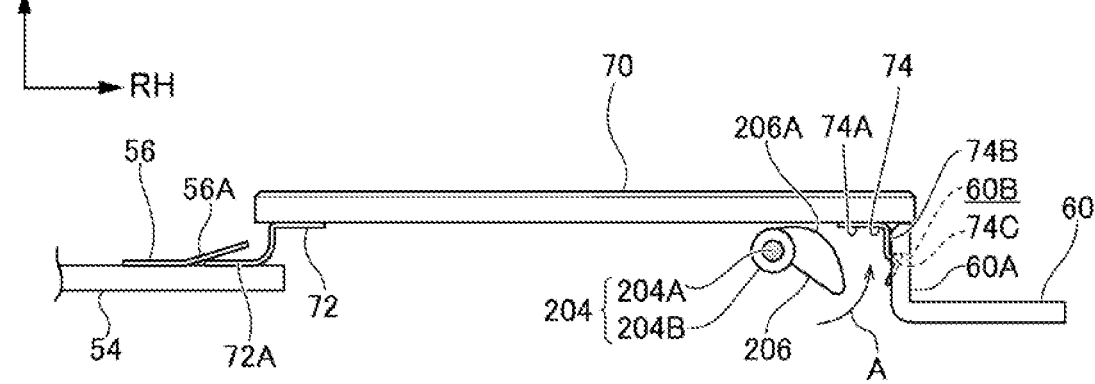
FIG. 11 A is a front view showing the fixed state of the needle plate shown in FIG. 10, viewed from the front.
FIG. 11B is a front view showing a state where a rotary shaft of the needle plate detachable mechanism is rotated from the state shown in FIG. 11A to a release position and the needle plate is pushed up.
FIG. 11C is a front view showing a state where the rotary shaft is rotated from the state shown in FIG. 11B to a non-release position.
Figure 11B:
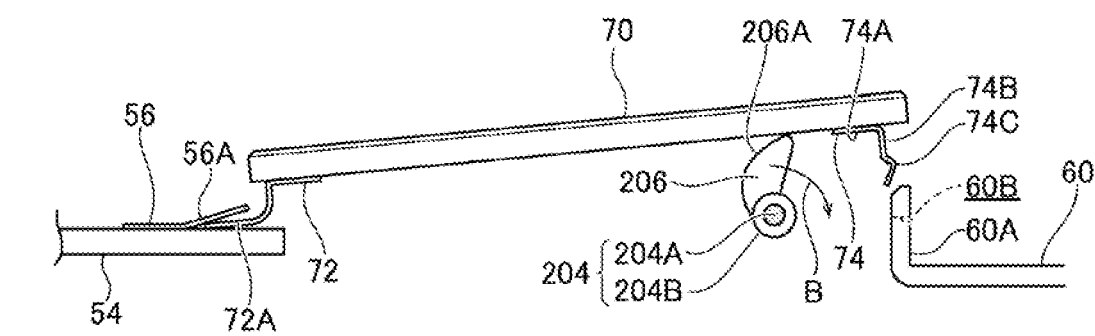
Figure 11C:
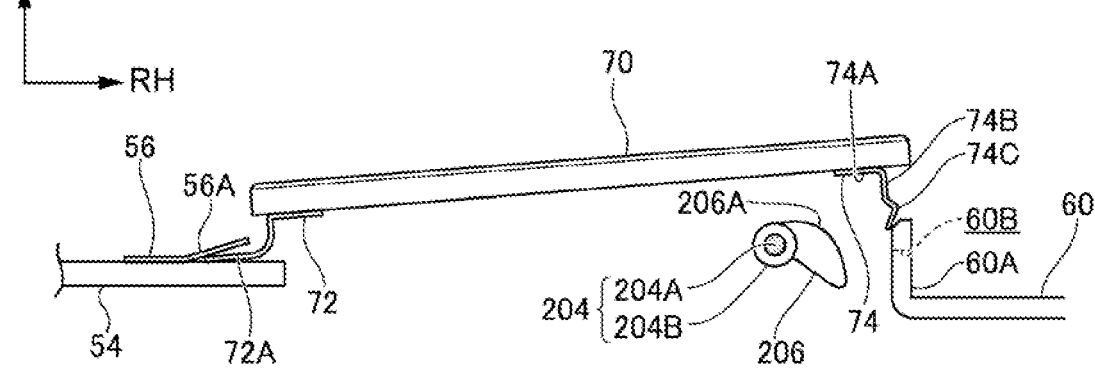

Next, a needle plate detachable mechanism 200 of the second embodiment will be explained with reference to FIG. 10 and FIG. 11. The needle plate detachable mechanism 200 of the second embodiment is configured in the same way as the needle plate detachable mechanism 80 of the first embodiment except for the below explained points. Note that the same reference numerals as the first embodiment are used in FIG. 10 and FIG. 11 for the members configured in the same way.

Namely, the needle plate detachable mechanism 200 has a rotary portion 202 to function as "releasing unit" and a rotating shaft drive mechanism 210 for rotating the rotary portion 202 to function as "fixing-release limiting unit" instead of the push-up bar 82, the release lever 88 and the electromagnet 90 of the needle plate detachable mechanism 80 of the first embodiment. In the needle plate detachable mechanism 200, the pair of front and rear engaging pieces 60A of the engaging plate 60 is bent upward at the left end of the engaging plate 60. The engaging holes 60B are penetratingly formed on the engaging pieces 60A. In addition, the plate spring 74 fixed to the needle plate 70 is arranged on the position corresponding to the pair of front and rear engaging pieces 60A of the engaging plate 60. Hereafter, the rotary portion 202 and the rotating shaft drive mechanism 210 will be explained.

(About Rotary Portion)

The rotary portion 202 includes a rotary shaft 204 and a cam 206 which is formed integrally with the rotary shaft 204. The cam 206 is an element realized as "push-up portion" in a broad sense.

<About Rotary Shaft>

The rotary shaft 204 is arranged below the right end of the needle plate 70 so that the axial direction of the rotary shaft 204 is aligned with the front-rear direction. Specifically, the rotary shaft 204 is arranged on the left side of the engaging plate 60. The rotary shaft 204 includes a core portion 204A having a circular cross-section to form an axial center of the rotary shaft 204 and an outer shaft portion 204B having an approximately cylindrical shape formed on an outer periphery of the core portion 204A. In the present embodiment, the core portion 204A is made of metal and the outer shaft portion 204B is made of resin (e.g., POM: polyoxymethylene). The core portion 204A and the outer shaft portion 204B are integrally formed by insert molding, for example. Specifically, the outer shaft portion 204B is integrally formed with the core portion 204A to cover the front side (one side in the axial direction) of the core portion 204A. Consequently, the rear end side of the core portion 204A is projected rearward compared to the outer shaft portion 204B. The rear end side of the core portion 204A is rotatably supported by the skeleton frame. In addition, the rear end of the core portion 204A is projected rearward compared to the lower cover 52 (not shown in FIG. 10 and FIG. 11).

<About Cam 206>

The cam 206 is provided on an intermediate portion in the longitudinal direction of the outer shaft portion 204B. The cam 206 is arranged between a pair of front and rear plate springs 74 (i.e., the pair of engaging pieces 60A of the engaging plate 60) when viewed from above. The cam 206 is formed in an approximately semielliptical shape when viewed from the front and projected obliquely rightward and downward from an outer periphery of the outer shaft portion 204B. Specifically, the cam 206 has a cam face 206A which is convexly bent obliquely upward and rightward when viewed from the front. The distance from the axial center of the rotary shaft 204 to the cam face 206A is specified to become gradually longer from the base end to the tip end of the cam face 206A. The base end side of the cam face 206A is arranged adjacent to the lower side of the needle plate 70 (for detail, slightly separated downward). The above described position of the rotary shaft 204 (cam 206) is shown in FIG. 11A and hereafter referred to as "non-release position." Although the details will be described later, when the rotary shaft 204 is rotated from the non-release position to one of the rotation directions (direction of Arrow A in FIG. 11A), the cam face 206A of the cam 206 pushes up the needle plate 70 to the upper side to release the engaged state between the engaging plate 60 and the plate spring 74. The above described position of the rotary shaft 204 (cam 206) is shown in FIG. 11B and hereafter referred to as "release position."

In addition, an operation dial 208 is provided on the rear end of the rotary shaft 204 (core portion 204A) so as to be integrally rotated with the rotary shaft 204. The operation dial 208 is formed in an approximately disk shape so that the axial direction of the operation dial 208 is aligned with the front-rear direction. The rear end of the rotary shaft 204 is fixed to an axial center of the operation dial 208. Consequently, the operation dial 208 is arranged on the outer side (for detail, rear side) of the lower cover 52 so as to be operable. When the operator rotates the operation dial 208, the rotary shaft 204 can be manually rotated.

(About Rotating Shaft Drive Mechanism)

The rotating shaft drive mechanism 210 includes a base plate 212, a needle plate motor 214, a transmission mechanism 220 and a link mechanism 226. The needle plate motor 214 is an element realized as "driving unit" in a broad sense.

<About Base Plate>

The base plate 212 is formed in an approximately rectangular plate shape extending in the front-rear direction so that the plate thickness direction is aligned with the up-down direction. The base plate 212 is separately arranged on the right side of the rotary shaft 204. The rear end of the base plate 212 is fixed to the skeleton frame. An exposure hole 212A having a circular shape is penetratingly formed on the front part of the base plate 212 at an approximately center in the left-right direction for exposing the later described output shaft 214A of the needle plate motor 214. In addition, a support shaft 212S is provided on the rear end of the base plate 212 for rotatably supporting the later described oscillating arm 224 of the transmission mechanism 220. The support shaft 212S is formed in an approximately cylindrical shape so that the axial direction of the support shaft 212S is aligned with the up-down direction. The support shaft 212S is projected upward from the base plate 212.

<About Needle Plate Motor>

The needle plate motor 214 is arranged adjacent to the lower side of the front part of the base plate 212 so that the axial direction of the needle plate motor 214 is aligned with the up-down direction. The needle plate motor 214 is fixed to the base plate 212 at a position not shown in the figure. Specifically, the needle plate motor 214 is arranged coaxially with the exposure hole 212A of the base plate 212. The output shaft 214A of the needle plate motor 214 is arranged in the exposure hole 212A. In addition, a pinion gear 222 forming the later described transmission mechanism 220 is provided on the output shaft 214A so as to be integrally rotated with the output shaft 214A. The pinion gear 222 is arranged on an upper side of the base plate 212. In addition, the needle plate motor 214 is formed as a stepping motor and electrically connected with the controller 94. The needle plate motor 214 is operated by the control of the controller 94.

<About Transmission Mechanism>

The transmission mechanism 220 includes the above described pinion gear 222 and oscillating arm 224. The oscillating arm 224 is formed in an approximately sector plate shape when viewed from above so that the plate thickness direction is aligned with the up-down direction. The oscillating arm 224 is arranged on the upper side of the base plate 212. A support boss 224A is formed on the base end (rear end) of the oscillating arm 224. The support boss 224A is formed in an approximately cylindrical shape so that the axial direction of the support boss 224A is aligned with the up-down direction. The support shaft 212S of the base plate 212 is inserted into the support boss 224A so as to be relatively rotative. Consequently, the oscillating arm 224 is rotatably supported by the support shaft 212S. Note that an E-ring ER is locked to the tip portion (upper end) of the support shaft 212S. The oscillating arm 224 is restricted from moving upward by the E-ring ER.

A rack portion 224B is formed on the tip portion (front end) of the oscillating arm 224. The rack portion 224B is curved in an approximately arc shape around the axial center of the support boss 224A (support shaft 212S) when viewed from above. The rack portion 224B is arranged on the rear side of the pinion gear 222 of the needle plate motor 214. In addition, a plurality of rack teeth is formed on the rack portion 224B. The rack teeth are engaged with the pinion gear 222. Consequently, when the needle plate motor 214 is operated, the oscillating arm 224 swings (rotates) around the axis of the support shaft 212S. Specifically, the oscillating arm 224 reciprocally swings (rotates) between "first position" shown in a solid line and "second position" shown in a two-dot chain line in FIG. 10.

Furthermore, a connecting pin 224P is formed on the tip end side of the oscillating arm 224. The connecting pin 224P is formed in an approximately cylindrical shape so that the axial direction of the connecting pin 224P is aligned with the up-down direction. The connecting pin 224P is projected upward from the oscillating arm 224.

<About Link Mechanism>

The link mechanism 226 includes a first link 228 formed integrally with the front end of the rotary shaft 204 (outer shaft portion 204B) and a second link 230. The first link 228 is formed in a plate shape so that the plate thickness direction is aligned with the front-rear direction. The first link 228 is extended obliquely leftward and downward from the front end of the outer shaft portion 204B when viewed from the front.

The second link 230 is formed in an approximately long plate shape extending in the left-right direction. Specifically, the second link 230 includes a link portion 230L which forms the left part of the second link 230 and a link portion 230R which forms the right part of the second link 230. The link portion 230L is arranged adjacent to the rear side of the first link 228 so that the plate thickness direction is aligned with the front-rear direction. The left end of the link portion 230L (one end in the longitudinal direction of the second link 230) is rotatably connected with the tip portion of the first link 228 by a connecting pin P so that the axial direction of the connecting pin P is aligned with the front-rear direction.

The link portion 230R is arranged on the rear side of the link portion 230L so that the plate thickness direction is aligned with the up-down direction. The front end of the left end of the link portion 230R is connected with the upper end of the right end of the link portion 230L. Consequently, the link portion 230R is arranged on the upper side of the link portion 230L. The right end of the link portion 230R (the other end in the longitudinal direction of the second link 230) is rotatably connected with the connecting pin 224P of the oscillating arm 224.

Consequently, interlocked with the reciprocating swing of the oscillating arm 224, the second link 230 reciprocally moves in the front-rear direction and the first link 228 (i.e., rotary shaft 204) reciprocally rotates around the axis of the rotary shaft 204. Specifically, the rotary shaft 204 is arranged at the non-release position when the oscillating arm 224 is in the first position, and the rotary shaft 204 is arranged at the release position when the oscillating arm 224 swings from the first position to the second position.

In the second embodiment, when the sewing machine 10 is driven by the sewing machine motor 22 (in the motor driving state), the determination unit 96 of the controller 94 determines to prohibit the operation of the needle plate motor 214. In addition, when the sewing machine 10 is not the motor driving state (i.e., non-driving state of the sewing machine motor 22) and the phase of the upper shaft 26 is the non-release phase, the determination unit 96 determines to prohibit the operation of the needle plate motor 214.

On the other hand, when the sewing machine 10 is not the motor driving state and the phase of the upper shaft 26 is the release phase, the determination unit 96 determines to allow the operation of the needle plate motor 214. When the determination unit 96 determines to allow the operation of the needle plate motor 214, the controller 94 operates the needle plate motor 214 based on the operation signals (operation signals for operating the needle plate motor 214) transmitted from the operation part 24.

In the needle plate detachable mechanism 200 of the second embodiment, the rotary shaft 204 is rotated when the needle plate motor 214 of the rotating shaft drive mechanism 210 is operated by the controller 94. In addition, the rotary shaft 204 is provided on the cam 206 so as to be integrally rotated with the rotary shaft 204. Therefore, the cam 206 is rotated integrally with the rotary shaft 204 to push up the needle plate 70 to the upper side. Consequently, the engaged state between the engaging plate 60 and the plate spring 74 is released and the fixed state of the needle plate 70 is released. Accordingly, convenience for replacing the needle plate 70 can be improved.

Here, as described above, when the sewing machine motor 22 is in the non-operation state and the needle tip of the needle 36 is positioned below the upper surface of the needle plate 70, the controller 94 prohibits the operation of the needle plate motor 214 and the rotary shaft 204 (rotary portion 202) is kept in the non-release position. In addition, when the sewing machine motor 22 is operated, the controller 94 prohibits the operation of the needle plate motor 214 and the rotary shaft 204 (rotary portion 202) is kept in the non-release position. Consequently, also in the second embodiment, the cam 206 of the rotary portion 202 can be prevented from releasing the fixed state of the needle plate 70.

As explained above, also in the second embodiment, the replacement of the needle plate 70 can be prevented in the situation not suitable for replacing the needle plate 70.

In the rotary portion 202, the cam 206 which is provided on the rotary shaft 204 so as to be integrally rotated has the cam face 206A. The cam face 206A is configured to be slidable on the lower surface of the needle plate 70. The distance from the axial center of the rotary shaft 204 to the cam face 206A is specified to become gradually longer from the base end to the tip end of the cam face 206A. Therefore, when the rotary shaft 204 is rotated from the non-release position to the release position, the needle plate 70 can be gradually pushed up by the cam face 206A of the cam 206. Consequently, the engaged state between the engaging plate 60 and the plate spring 74 is gradually released and the needle plate 70 can be removed from the bed part 16. As a result, when the engaged state between the plate spring 74 and the engaging plate 60 is released, the needle plate 70 is prevented from being jumped up suddenly from the bed part 16.

In addition, the rotary shaft 204 includes the core portion 204A made of metal to form an axial center of the rotary shaft 204 and the outer shaft portion 204B made of resin to form an outer periphery of the rotary shaft 204. The cam 206 is integrally formed with the outer shaft portion 204B. Therefore, the rotary shaft 204 having the cam 206 can be manufactured at low cost while the strength of the rotary shaft 204 is kept.

In addition, if the outer shaft portion 204B is formed by a material (POM) having a relatively good sliding property, for example, the cam face 206A is slid well on the needle plate 70 when the rotary shaft 204 is rotated. Thus, the needle plate 70 can be pushed up to the upper side by the cam 206.

Furthermore, since the outer shaft portion 204B is made of resin, generation of abnormal noise can be suppressed when the cam face 206A slides on the lower surface of the needle plate 70.

In addition, the operation dial 208 is provided on the rear end of the rotary shaft 204 so as to be integrally rotated with the rotary shaft 204. The operation dial 208 is exposed outside the lower cover 52 so as to be operable. Therefore, when the operation dial 208 is rotationally operated, the fixed state of the needle plate 70 can be released by manually rotating the rotary shaft 204. Consequently, the needle plate 70 can be removed from the bed part 16 in an emergency, for example, when the needle plate motor 214 is broken.

In the needle plate detachable mechanism 200, the cam 206 for pushing up the needle plate 70 is arranged between the pair of front and rear plate springs 74 in the front-rear direction. Therefore, the force for releasing the engaged state between the engaging plate 60 and the plate spring 74 by the cam 206 can be divided into the pair of plate springs 74 in good balance. Consequently, the engaged state between the engaging plate 60 and the pair of plate springs 74 can be released favorably.

In addition, the rotating shaft drive mechanism 210 includes the link mechanism 226 which is connected with the rotary shaft 204 and the transmission mechanism 220 which transmits a driving force of the needle plate motor 214 to the link mechanism 226. Consequently, the driving force of the needle plate motor 214 is transmitted to the link mechanism 226 and the rotary shaft 204 can be rotated between the non-release position and the release position. In addition, by using the link mechanism 226, the needle plate motor 214 can be installed in an arbitrary position in the bed part 16 which is separated from the rotary shaft 204.

In addition, the transmission mechanism 220 of the rotating shaft drive mechanism 210 includes the pinion gear 222 which is provided on the output shaft 214A of the needle plate motor 214 so as to be integrally rotated and the oscillating arm 224 having the rack portion 224B engaged with the pinion gear 222. The second link 230 of the link mechanism 226 is connected with the oscillating arm 224 so as to be relatively rotative. Consequently, the rotative force of the needle plate motor 214 is converted into linear motion and the rotary shaft 204 can be reciprocally rotated by the link mechanism 226 by a simple configuration.

Although the needle plate detachable mechanism 200 has the rotating shaft drive mechanism 210 (needle plate motor 214) and the rotary portion 202 is automatically rotated by the rotating shaft drive mechanism 210 (needle plate motor 214) in the second embodiment, the rotating shaft drive mechanism 210 can be omitted in the needle plate detachable mechanism 200 and the rotary portion 202 can be manually rotated. In the above described case, the electromagnet 90 and the solenoid 102 of the first embodiment can be applied to the needle plate detachable mechanism 200. When applying the electromagnet 90 to the needle plate detachable mechanism 200, the fixed state of the needle plate 70 can be locked by magnetically attaching the needle plate 70 by the electromagnet 90 same as the first embodiment, for example. In addition, when applying the solenoid 102 to the needle plate detachable mechanism 200, the fixed state of the needle plate 70 can be locked by engaging the plunger 102B of the solenoid 102 with the engaging plate 104 of the needle plate 70 same as the first embodiment, for example.

In the first embodiment (including variation examples 1 to 3) and the second embodiment, the replacement of the needle plate 70 is prevented when the sewing machine motor 22 is not driven and the phase of the upper shaft 26 is the non-release phase and when the sewing machine motor 22 is driven. Instead of the above described configuration, the replacement of the needle plate 70 can be prevented when the sewing machine motor 22 is not driven and the phase of the upper shaft 26 is the non-release phase or when the sewing machine motor 22 is driven.

In the first embodiment (including variation examples 1 to 3) and the second embodiment, in case of applying the electromagnet 90 or the solenoid 102, the electromagnet 90 (solenoid 102) is operated by the controller 94 when the sewing machine motor 22 is driven. However, the electromagnet 90 (solenoid 102) can be operated interlockingly with the sewing machine motor 22 without being controlled by the controller 94. In the above described case, the electromagnet 90 (solenoid 102) is connected with a power source for supplying power to the sewing machine motor 22 in parallel with the sewing machine motor 22. Consequently, when the power is supplied from the power source to the sewing machine motor 22, the power is also supplied from the power source to the electromagnet 90 (solenoid 102). Therefore, the electromagnet 90 (solenoid 102) can be operated interlockingly with the sewing machine motor 22. Accordingly, the electromagnet 90 (solenoid 102) is operated by a simple configuration and the replacement of the needle plate 70 can be prevented when the sewing machine motor 22 is driven.

In the first embodiment, although the needle plate 70 itself is the magnetic body, it is not necessary to form the entire needle plate 70 as the magnetic body. In order to magnetically attach the electromagnet 90 to the needle plate 70, it is possible to form only a portion near the upper surface of the electromagnet 90 by the magnetic body when the needle plate 70 is in the fixed state. Therefore, the present invention can be carried out even when the needle plate 70 made of resin is used by partly attaching a metal plate (magnetic body).

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A needle plate detachable mechanism of a sewing machine which forms a seam by vertically driving a needle by a driving force of a sewing machine motor, the needle plate detachable mechanism comprising:
   a needle plate fixing unit for fixing a needle plate on a sewing machine body;
   a releasing unit for releasing a fixed state of the needle plate;
   a fixing-release limiting unit for limiting a release of the fixed state of the needle plate
   a detector for detecting a vertical position of the needle; and
   a controller which is electrically connected with the sewing machine motor, the detector and the fixing-release limiting unit to determine an operation of the fixing-release limiting unit, wherein
   the controller operates the fixing-release limiting unit for limiting the release of the fixed state of the needle plate when a needle tip of the needle is positioned below an upper surface of the needle plate based on the vertical position of the needle detected by the detector, and
   the controller operates the fixing-release limiting unit for limiting the release of the fixed state of the needle plate when the sewing machine motor is driven.

2. The needle plate detachable mechanism according to claim 1, wherein
   the fixing-release limiting unit is configured to increase a fixing force of the needle plate.

3. The needle plate detachable mechanism according to claim 1, wherein
   the fixing-release limiting unit prohibits the operation of the releasing unit.

4. The needle plate detachable mechanism according to claim 1, wherein
   the fixing-release limiting unit is provided on the sewing machine body,
   the fixing-release limiting unit is an electromagnet capable of being magnetically attached to the needle plate or the releasing unit, and
   the releasing unit is prevented from releasing the fixed state when the needle plate or the releasing unit is magnetically attached to the fixing-release limiting unit.

5. The needle plate detachable mechanism according to claim 1, wherein
   the fixing-release limiting unit has an engaging unit which is engageable with the needle plate or the releasing unit,
   the fixing-release limiting unit is movable between a release limiting position where the fixing-release limiting unit is engaged with the needle plate or the releasing unit and a release permitting position where the fixing-release limiting unit is disengaged with the needle plate or the releasing unit, the fixing-release limiting unit is prevented from releasing the fixed state in the release limiting position, and the fixing-release limiting unit is permitted to release the fixed state in the release permitting position.

6. The needle plate detachable mechanism according to claim 1, wherein the fixing-release limiting unit is a solenoid, and the engaging unit is a plunger of the solenoid.

7. A sewing machine having the needle plate detachable mechanism of claim 1.

* * * * *